(12) United States Patent
Ozaki et al.

(10) Patent No.: US 9,197,863 B2
(45) Date of Patent: Nov. 24, 2015

(54) DISPLAY SYSTEM THAT DISPLAYS AUGMENTED REALITY IMAGE OF POSTED DATA ICONS ON CAPTURED IMAGE FOR VEHICLE-MOUNTED APPARATUS

(71) Applicant: FUJITSU TEN LIMITED, Kobe-shi, Hyogo (JP)

(72) Inventors: Yukisuke Ozaki, Kobe (JP); Satoru Mutoh, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 334 days.

(21) Appl. No.: 13/782,701

(22) Filed: Mar. 1, 2013

(65) Prior Publication Data
US 2013/0286206 A1 Oct. 31, 2013

(30) Foreign Application Priority Data
Apr. 27, 2012 (JP) .................................. 2012-103565

(51) Int. Cl.
*G06T 19/00* (2011.01)
*H04N 7/18* (2006.01)

(52) U.S. Cl.
CPC ................ *H04N 7/18* (2013.01); *G06T 19/006* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2010/0020169 A1* | 1/2010 | Jang et al. ..................... | 348/115 |
| 2010/0123737 A1* | 5/2010 | Williamson et al. ......... | 345/672 |
| 2011/0291863 A1* | 12/2011 | Ozaki et al. ............... | 340/995.14 |
| 2011/0310250 A1* | 12/2011 | Inui et al. ..................... | 348/175 |
| 2012/0176525 A1* | 7/2012 | Garin et al. ............... | 348/333.02 |
| 2013/0038734 A1* | 2/2013 | Furukawa ..................... | 348/148 |
| 2013/0178257 A1* | 7/2013 | Langseth ............... | G06T 17/05 463/4 |

FOREIGN PATENT DOCUMENTS

| | | |
|---|---|---|
| JP | A-2001-229363 | 8/2001 |
| JP | A-2005-215453 | 8/2005 |
| JP | A-2007-133464 | 5/2007 |
| JP | A-2007-158473 | 6/2007 |
| JP | A-2009-025136 | 2/2009 |
| JP | A-2009-087031 | 4/2009 |
| JP | A-2009-199572 | 9/2009 |
| JP | A-2011-186681 | 9/2011 |
| JP | A-2011-247831 | 12/2011 |
| JP | A-2011-247832 | 12/2011 |
| JP | A-2011-259253 | 12/2011 |
| JP | A-2012-027606 | 2/2012 |

OTHER PUBLICATIONS

How to—Sekai Camera Support Center (information on the wen: http://support.sekaicamera.com/en/how-to/tag).

* cited by examiner

*Primary Examiner* — Kevin McInnish
(74) *Attorney, Agent, or Firm* — Oliff PLC

(57) ABSTRACT

A mobile apparatus obtains a posted data set of a social networking service. The mobile apparatus generates an augmented reality image by superimposing, on a captured image, an icon representing a posted data set posted in an objective capturing range of a camera, based on a posted location of the posted data set, a vehicle location of a vehicle, and a direction of an optical axis of the camera. The mobile apparatus transmits the generated augmented reality image to a vehicle-mounted apparatus. The vehicle-mounted apparatus displays the received augmented reality image on a display. Thus a user who sees the vehicle-mounted apparatus can instinctively understand the posted location of the posted data set.

13 Claims, 15 Drawing Sheets

| POSTED CONTENT ID | T0123456789 |
|---|---|
| WRITER | johnsmith |
| POSTED DATE AND TIME | 2012/07/07 12:55 |
| POSTED CONTENT | I'm here. #TwitDrive |
| POSTED LOCATION | N 35.658704  E139.745408 |
| ATTACHED IMAGE | pic.twitdrive.com/N2UD6ts |

DISPLAY SYSTEM THAT DISPLAYS AUGMENTED REALITY IMAGE OF POSTED DATA ICONS ON CAPTURED IMAGE FOR VEHICLE-MOUNTED APPARATUS

BACKGROUND OF THE INVENTION

1. Field of the Invention

The invention relates to a technology for displaying images in a vehicle.

2. Description of the Background Art

Conventionally, a vehicle-mounted apparatus, such as a car navigation apparatus, is capable of providing a user with timely information of a vicinity of a vehicle, such as traffic information, by obtaining information provided by, for example, VICS (Vehicle Information and Communication System) (registered trademark in Japan).

Moreover, recently, a vehicle-mounted apparatus that displays a posted content of posted data posted on a social networking service (SNS) such as twitter (registered trademark) is also known. The user of such a vehicle-mounted apparatus can obtain a variety of timely information, not limited to predetermined items such as traffic information. For example, the user can confirm a state of congestion in an arbitrary place.

Meanwhile, the conventional vehicle-mounted apparatus compatible with a social networking service displays a posted location at which the posted data has been posted, on a two dimensional (2D) map image. In such a display style, there is a case where the user has a difficulty to understand a relation between a real view from the vehicle and the posted location of the posted data.

SUMMARY OF THE INVENTION

According to one aspect of the invention, a display system includes a vehicle-mounted apparatus for being mounted on a vehicle and a portable mobile apparatus configured to communicate with the vehicle-mounted apparatus, the display system comprising: a camera that generates a captured image of a vicinity of the vehicle; a location obtaining part that obtains a vehicle location of the vehicle; a direction obtaining part that obtains a direction of an optical axis of the camera; a data obtaining part that obtains a posted data set of a social networking service; a generator that generates an augmented reality image by superimposing, on the captured image, an icon representing the posted data set posted in an objective capturing range of the camera, based on a posted location of the posted data set, the vehicle location, and the direction of the optical axis; and a display, included in the vehicle-mounted apparatus, that displays the augmented reality image.

The augmented reality image generated by superimposing, on the captured image that shows a real view of the vicinity of the vehicle, the icon representing the posted data set posted in the objective capturing range of the camera that has generated the captured image, is displayed on the vehicle-mounted apparatus. Thus, a user who sees the vehicle-mounted apparatus can instinctively understand a posted location of a posted data set.

According to another aspect of the invention, the camera is included in the mobile apparatus, and the display system further includes a holder that holds the mobile apparatus in the vehicle such that the camera generates the captured image of the vicinity of the vehicle.

An image of the vicinity of the vehicle can be generated by the camera included in the mobile apparatus.

According to another aspect of the invention, the display system further includes a line setting part that sets, in accordance with a user operation, a standard line serving as a standard for a position in a vertical direction for superimposing the icon on the captured image.

Since standard line serving as a standard for a position in a vertical direction for superimposing the icon can be set, regardless of a position or a lean of the mobile apparatus fixed to the vehicle, the icon can be placed at an easy-to-see position.

Thus, an object of the invention is to enable a user who sees a vehicle-mounted apparatus to instinctively understand a posted location of a posted data set.

These and other objects, features, aspects and advantages of the invention will become more apparent from the following detailed description of the invention when taken in cooperation with the accompanying drawings.

DESCRIPTION OF THE EMBODIMENTS

Embodiments of the invention are explained below with reference to the drawings.

<1. System Outline>

Figure 1:
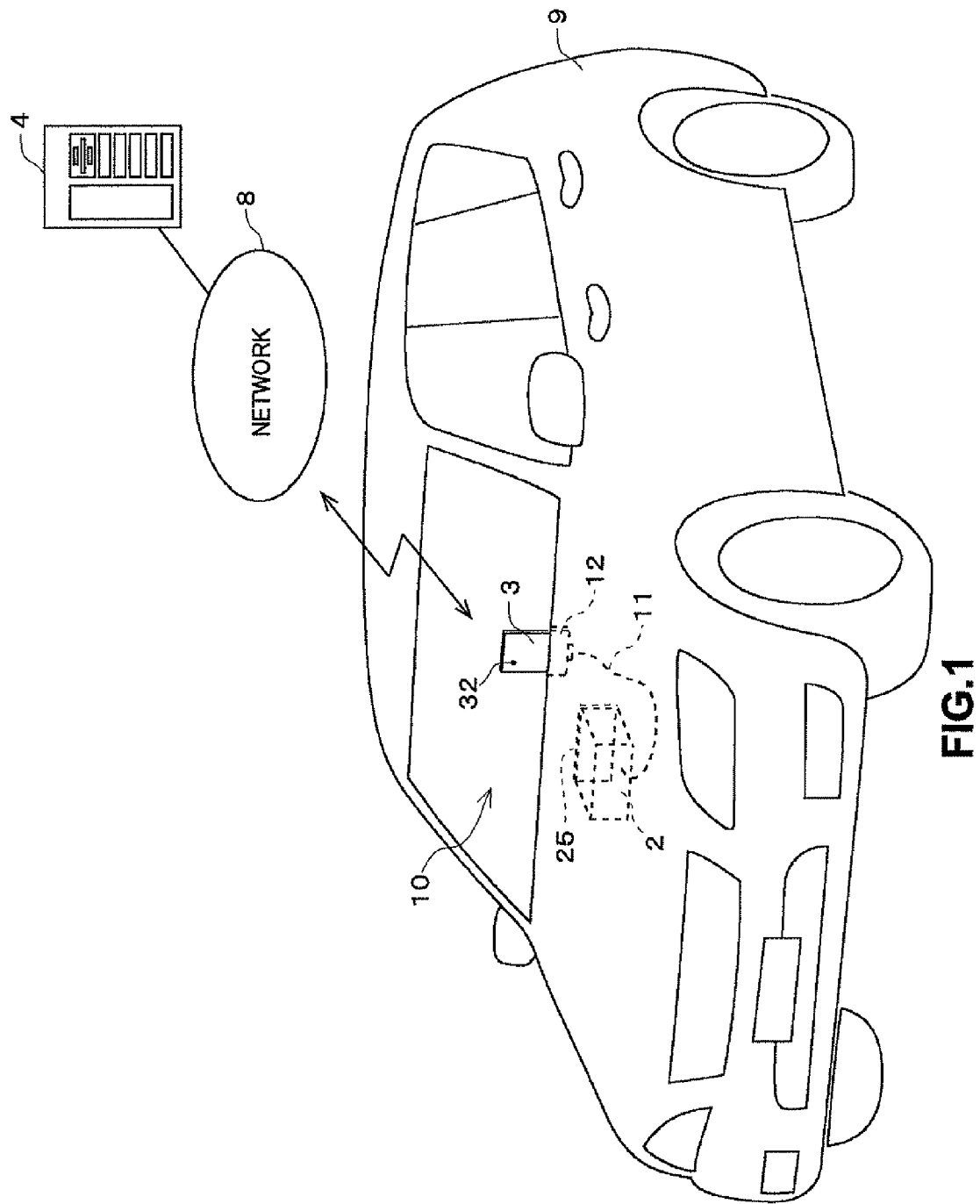
FIG. 1 illustrates an outline of a display system.

FIG. 1 illustrates an outline of a display system 10 in this embodiment. The display system 10 includes a vehicle-mounted apparatus 2 that is mounted on a vehicle 9, such as a car, and a mobile apparatus 3 that is configured separately from the vehicle-mounted apparatus 2.

The vehicle-mounted apparatus 2 is an electronic apparatus that is mounted and fixed in a cabin of the vehicle 9. The vehicle-mounted apparatus 2 is, for example, a navigation apparatus that includes a navigation function of providing a route leading to a destination set by a user. The vehicle-mounted apparatus 2 includes a display 25 that displays a variety of images. The vehicle-mounted apparatus 2 is disposed at a location, for example, in a dashboard located in a front portion of the cabin of the vehicle 9, where the user in the vehicle 9 can easily see a screen of the display 25.

On the other hand, the mobile apparatus 3 is, for example, a mobile electronic apparatus, such as a smartphone. When being used as a part of the display system 10, the mobile apparatus 3 is fixed, for example, on the dashboard or windshield of the vehicle 9, by using a holder 12 that holds the mobile apparatus 3. The holder 12 does not permanently fix the mobile apparatus 3, but the mobile apparatus 3 can be removed arbitrarily from the holder 12.

The mobile apparatus 3 includes a camera 32 that generates a captured image of a subject, on a principle surface of a back side of the mobile apparatus 3. Since the mobile apparatus 3 is fixed to the vehicle 9 by the holder 12, an optical axis of the camera 32 faces a front direction of the vehicle 9. As a result, the camera 32 generates the captured image of a vicinity of the vehicle 9 that is a front of the vehicle 9, and the captured image shows a real front view in front of the vehicle 9 at a similar point of view of a driver of the vehicle 9. Moreover, when the mobile apparatus 3 is disposed as mentioned above, a screen of a display provided on a principle surface of a front side of the mobile apparatus 3 faces an inside of the cabin. Therefore, the user in the vehicle 9 can also see the screen of the display of the mobile apparatus 3.

The user in the vehicle 9 can see both displays of the vehicle-mounted apparatus 2 and the mobile apparatus 3. However, generally, a size of the display of the vehicle-mounted apparatus 2 is larger than a size of the display of the mobile apparatus 3. Moreover, the display 25 of the vehicle-mounted apparatus 2 is generally disposed at a location appropriately visible from a driver seat of the vehicle 9. Thus the driver of the vehicle 9 preferentially sees the display 25 of the vehicle-mounted apparatus 2 over the mobile apparatus 3 to obtain the variety of information from the display 25. Naturally, it is possible for the driver of the vehicle 9 to obtain the information by seeing the display of the mobile apparatus 3. On the other hand, a passenger in a front passenger seat of the vehicle 9 can obtain the information by seeing the displays of the vehicle-mounted apparatus 2 and the mobile apparatus 3 equally.

The vehicle-mounted apparatus 2 is connected to the mobile apparatus 3 via a signal cable 11 that is a composite cable capable of transmitting both a data signal and a video signal. Therefore, the vehicle-mounted apparatus 2 and the mobile apparatus 3 are capable of mutually transmitting and receiving data to/from each other via the signal cable 11. Moreover, the mobile apparatus 3 is capable of continuously transmitting images each of which serves as a frame of the video signal, in a predetermined cycle, to the vehicle-mounted apparatus 2 via the signal cable 11. Thus, the display 25 of the vehicle-mounted apparatus 2 is capable of displaying the image transmitted from the mobile apparatus 3 to the vehicle-mounted apparatus 2.

Furthermore, the mobile apparatus 3 has a communication function of communicating with a communication apparatus connected to a network 8, such as the Internet, via the network 8. The mobile apparatus 3 is capable of communicating with a server apparatus 4 that provides a social networking service (hereinafter referred to as SNS"), such as Twitter (registered trademark).

Figure 2:
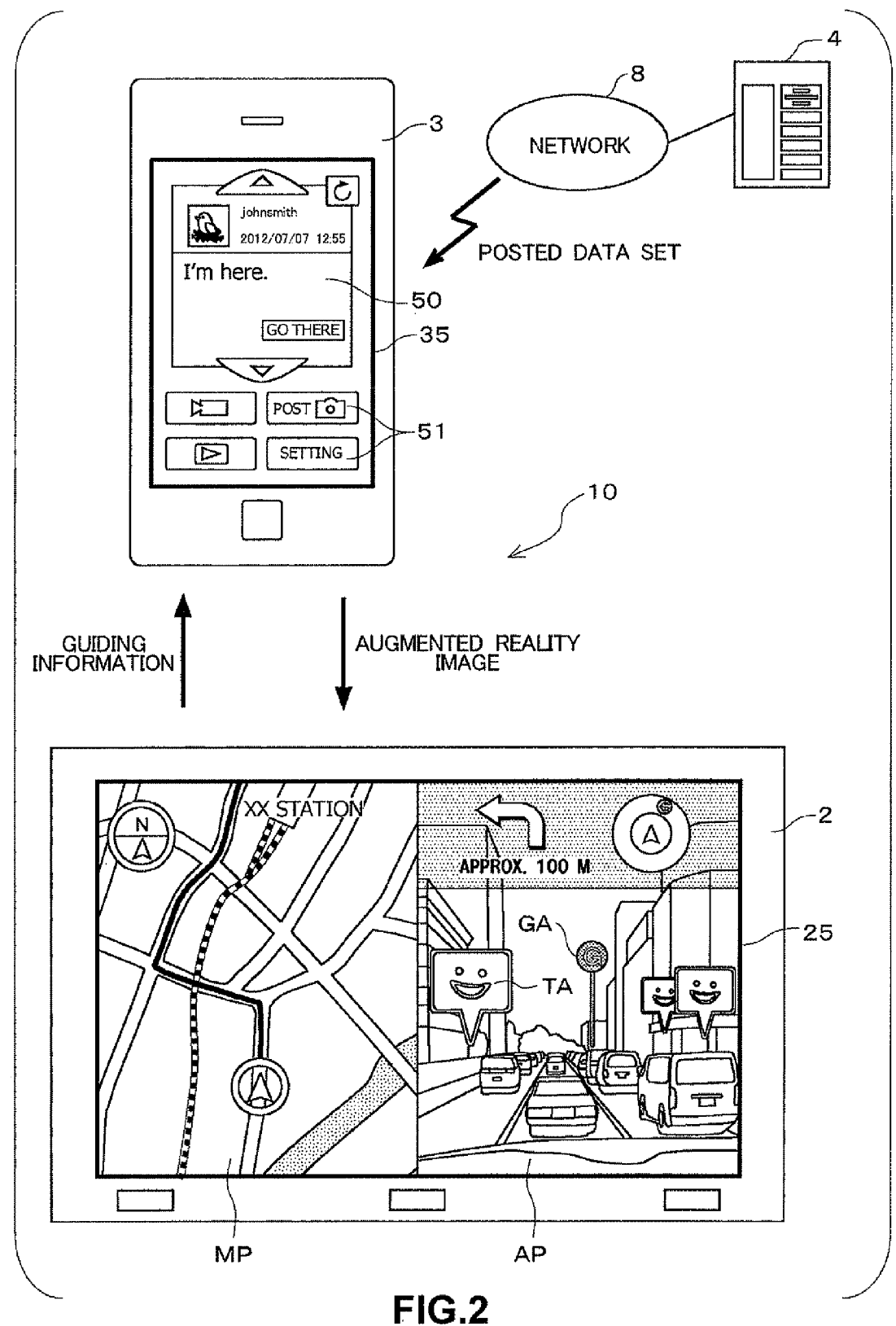
FIG. 2 illustrates an outline of a function of the display system.

FIG. 2 illustrates an outline of a function of the display system 10. The mobile apparatus 3 generates an augmented reality image AP by using an AR (Augmented Reality) technology. In other words, the mobile apparatus 3 generates the augmented reality image AP by adding various types of information to the captured image that shows a real view in front of the vehicle 9 generated by the camera 32.

The mobile apparatus 3 obtains, from the vehicle-mounted apparatus 2, guiding information relating to the navigation function that provides route guidance to the destination as information that is added to the captured image. Moreover, the mobile apparatus 3 obtains a set of posted data (posted data set) posted to the SNS, from the server apparatus 4 via the network 8. The mobile apparatus 3 generates the augmented reality image AP by superimposing an icon, etc. based on the guiding information and the posted data set, on the captured image.

The mobile apparatus 3 transmits the generated augmented reality image AP to the vehicle-mounted apparatus 2. The vehicle-mounted apparatus 2 receives the augmented reality image AP from the mobile apparatus 3 and displays the received augmented reality image AP on the display 25. The vehicle-mounted apparatus 2 displays the augmented reality image AP and a map image MP that shows a map of the vicinity of the vehicle 9 for the navigation function, on a same screen of the display 25 side by side. As shown in FIG. 2, the screen of the display 25 is divided into right and left sides. The map image MP is displayed on one side, and the augmented reality image AP is displayed on the other side.

The augmented reality image AP is repeatedly generated in a predetermined cycle (e.g. 1/30 sec.). The continuously generated augmented reality image AP is transmitted to the vehicle-mounted apparatus 2 as the frame of the video signal and is displayed on the display 25. Therefore, the augmented reality image AP displayed on the display 25 of the vehicle-mounted apparatus 2 shows the real view of the front of the vehicle 9 in substantially real time. By seeing the display 25 of the vehicle-mounted apparatus 2, the user of the display system 10 (especially the driver of the vehicle 9) can confirm the real view of the front of the vehicle 9 along with the map of the vicinity of the vehicle 9. Moreover, the user can understand a variety of information relating to the guiding information and the posted data set from the icon, etc. included in the augmented reality image AP.

Moreover, when being connected with the vehicle-mounted apparatus 2 as described above, the mobile apparatus 3 does not display the augmented reality image AP on a display 35 of the mobile apparatus 3 but displays a window 50 that shows a concrete posted content of the posted data set, an operation button (command button) 51 that receives a user operation, etc. The augmented reality image AP does not include such a window 50 or such an operation button 51. Therefore, the posted content of the posted data set and the operation button 51 are not displayed on the vehicle-mounted apparatus 2.

As described above, in the display system 10, information displayed on the vehicle-mounted apparatus 2 and information displayed on the mobile apparatus 3 are different from one another. Thus both screens of the vehicle-mounted apparatus 2 and the mobile apparatus 3 can be effectively used, so that it is possible to provide a variety of information to the user. Moreover, since not being displayed on the vehicle-mounted apparatus 2, the posted content of the posted data set and the operation button 51 do not interfere with displaying of the augmented reality image AP on the vehicle-mounted apparatus 2 which the driver of the vehicle 9 sees mainly. A configuration and a process of the display system 10 are hereinafter explained in detail.

<2. System Configuration>

Figure 3:
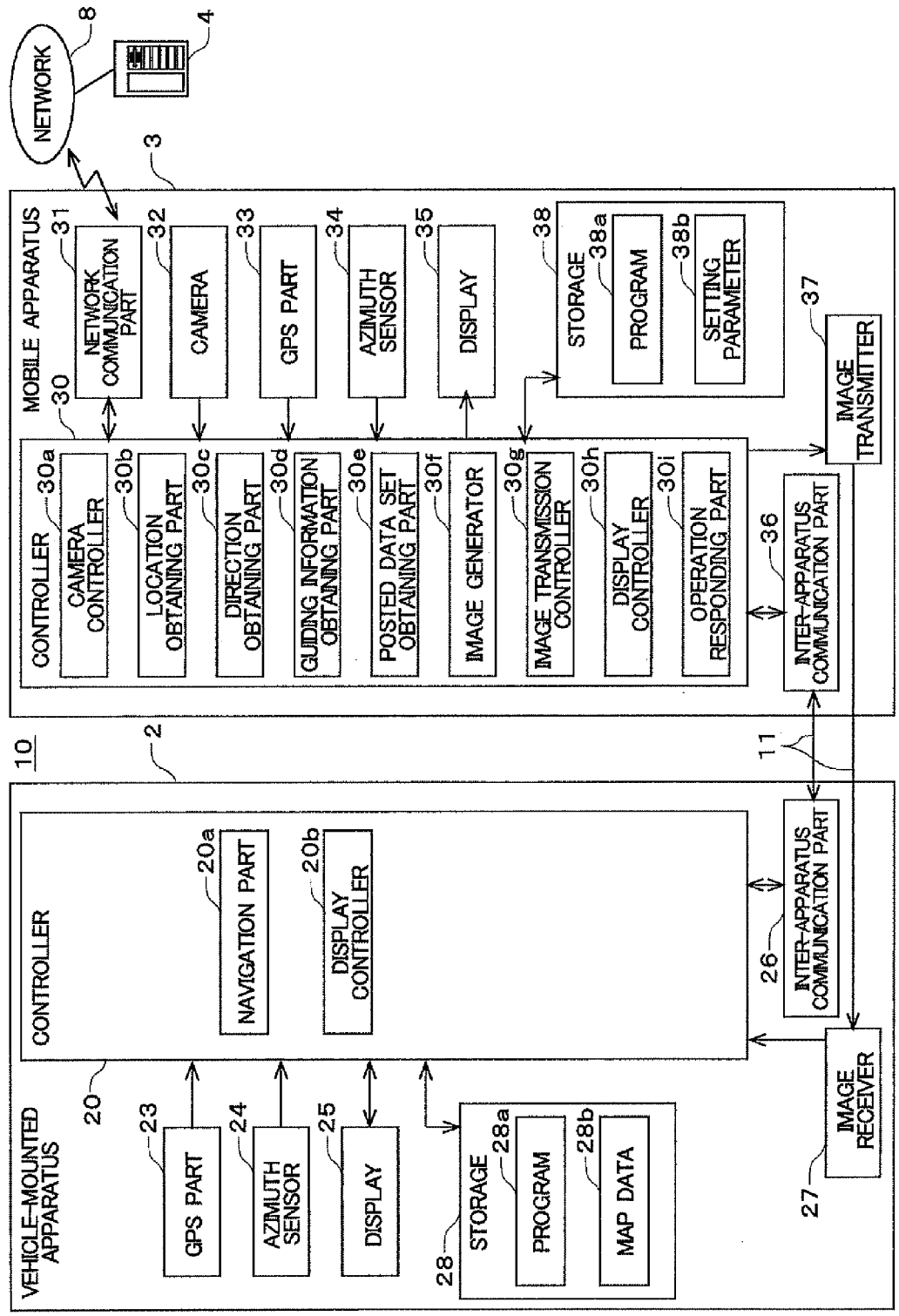
FIG. 3 illustrates a configuration of the display system.

FIG. 3 illustrates the configuration of the display system 10. A configuration of the vehicle-mounted apparatus 2 is illustrated on a left side of FIG. 3, and a configuration of the mobile apparatus 3 is illustrated on a right side of FIG. 3.

The vehicle-mounted apparatus 2 includes a controller 20, a GPS part 23, an azimuth sensor 24, the display 25, an inter-apparatus communication part 26, an image receiver 27, and a storage 28. The controller 20 includes a CPU, a RAM, a ROM, etc. and is a microcomputer that controls an entirety of the vehicle-mounted apparatus 2.

The GPS part 23 obtains a location of the vehicle-mounted apparatus 2 at a current time point by receiving signals from GPS satellites. Since the vehicle-mounted apparatus 2 is mounted on the vehicle 9, the GPS part 23 obtains a vehicle location that is a location of the vehicle 9 at the current time point. The vehicle location is represented in a longitude and a latitude. Moreover, the azimuth sensor 24 obtains an azimuth of the front direction of the vehicle 9, based on earth magnetism, etc.

The display 25 includes, for example, a liquid crystal panel, and displays the variety of information.

The inter-apparatus communication part 26 transmits and receives data to/from the mobile apparatus 3 via the signal cable 11 in a predetermined communication method. The inter-apparatus communication part 26 transmits the guiding information relating to the navigation function of providing the route leading to the destination, to the mobile apparatus 3. The guiding information includes a destination location, a turn direction at a next guidance point where guidance is provided on the route, a distance to the next guidance point, etc. The destination location is represented in a longitude and a latitude.

The image receiver 27 receives the video signal from the mobile apparatus 3 via the signal cable 11. The augmented reality image AP generated by the mobile apparatus 3 is included in the video signal in a predetermined cycle.

The storage 28 is, for example, a nonvolatile memory such as a flash memory, and stores a variety of information. The storage 28 stores a program 28a and map data 28b. The CPU in the controller 20 implements an arithmetic processing in accordance with the program 28a stored in the storage 28. Thus various functions are implemented in the controller 20 by software. A navigation part 20a and a display controller 20b shown in FIG. 3 are a part of the functions implemented by software when the program 28a is executed.

The navigation part 20a implements the navigation function of providing the route guidance to the destination. The navigation part 20a supplies the guiding information to be transmitted to the mobile apparatus 3 from the inter-apparatus communication part 26. The navigation part 20a generates the map image MP that shows the map of the vicinity of the vehicle 9, based on the map data 28b stored in the storage 28 and the vehicle location. Moreover, when the user sets a destination, the navigation part 20a derives a route leading to the destination from the location of the vehicle 9 at a current time point and then superimposes the derived route on the map image MP.

The display controller 20b controls display on the display 25. When the vehicle-mounted apparatus 2 is connected with the mobile apparatus 3, the display controller 20b displays the map image MP generated by the navigation part 20a and the augmented reality image AP transmitted from the mobile apparatus 3, side by side on the same screen of the display 25. (Refer to FIG. 2.) Moreover, when the vehicle-mounted apparatus 2 is not connected with the mobile apparatus 3, the display controller 20b displays the map image MP on an entire screen of the display 25.

Meanwhile, the mobile apparatus 3 includes a controller 30, a network communication part 31, the camera 32, a GPS part 33, an azimuth sensor 34, the display 35, an inter-apparatus communication part 36, an image transmitter 37, and the storage 38. The controller 30 includes a CPU, a RAM, a ROM, etc. and is a microcomputer that controls an entirety of the mobile apparatus 3.

The network communication part 31 has a function of connecting to the network 8 in a predetermined wireless communication method, such as 3G, WiMAX and LTE. Therefore, the network communication part 31 is capable of transmitting and receiving data to/from another communication apparatus such as the server apparatus 4, via the network 8. The network communication part 31 receives the posted data posted to the SNS, from the server apparatus 4 that provides the SNS.

The camera 32 includes a lens and an image sensor, and electronically generates the captured image of a subject. As mentioned above, the optical axis of the lens of the camera 32 faces the front direction of the vehicle 9. Therefore, the camera 32 generates the captured image of the subject in the front of the vehicle 9 viewed from the cabin of the vehicle 9.

The GPS part 33 obtains the location of the mobile apparatus 3 at a current time point by receiving the signals from the GPS satellites. Since the mobile apparatus 3 is used in the vehicle 9 as a part of the display system 10, the GPS part 33 actually obtains the vehicle location that is the location of the vehicle 9 at a current time point. The vehicle location is represented in a longitude and a latitude.

The azimuth sensor 34 obtains an azimuth of a direction of the optical axis of the camera 32, based on earth magnetism, etc. Since the optical axis of the camera 32 faces the front direction of the vehicle 9, the azimuth sensor 34 obtains actually an azimuth of the front direction of the vehicle 9 at a current time point.

The display 35 includes, for example, a liquid crystal panel and displays a variety of information. Moreover, the display 35 includes a touch panel and receives a user operation. When the user touches the display 35 serving as the touch panel, the controller 30 determines a content of the user operation based on a coordinate of a point which the user has touched.

The inter-apparatus communication part 36 transmits and receives data to/from the vehicle-mounted apparatus 2 via the signal cable 11 in the predetermined communication method. The inter-apparatus communication part 36 receives the guiding information from the vehicle-mounted apparatus 2.

The image transmitter 37 transmits the video signal to the vehicle-mounted apparatus 2 via the signal cable 11. The image transmitter 37 converts the augmented reality image AP generated continuously by the mobile apparatus 3, to the frame of the video signal of a predetermined format, such as NTSC, and then transmits the converted video signal to the vehicle-mounted apparatus 2.

The storage 38 is, for example, a nonvolatile memory such as a flash memory, and stores a variety of information. The storage 38 stores a program 38a for an application and a setting parameter 38b used for the application. The CPU in the controller 30 implements an arithmetic processing in accordance with the program 38a stored in the storage 38. Thus various functions of the application are implemented in the controller 30 by software. Such a program 38a is obtained by reading from a non-transitory computer-readable recording medium that stores the program 38a or by communication via the network 8 or in other methods, and is stored in the storage 38 beforehand.

A camera controller 30a, a location obtaining part 30b, a direction obtaining part 30c, a guiding information obtaining part 30d, a posted data set obtaining part 30e, an image generator 30f, an image transmission controller 30g, a display controller 30h, and an operation responding part 30i, illustrated in FIG. 3, are functions of the application implemented by software when the program 38a is executed.

The camera controller 30a controls the camera 32 to repeatedly obtain the captured image that shows the real view of the front of the vehicle 9, in a predetermine cycle (e.g. 1/30 sec.). The location obtaining part 30b controls the GPS part 33 to obtain the vehicle location of the vehicle 9 at a current time point. The direction obtaining part 30c controls the azimuth sensor 34 to obtain an azimuth of the optical axis of the camera 32, in other words, the azimuth of the front direction of the vehicle 9 at a current time point.

The guiding information obtaining part 30d controls the inter-apparatus communication part 36 to transmit a command signal to the vehicle-mounted apparatus 2 and to obtain the guiding information transmitted from the vehicle-mounted apparatus 2 in response to the command signal. Moreover, the posted data set obtaining part 30e controls the network communication part 31 to transmit a command signal to the server apparatus 4 and to obtain the posted data set transmitted from the server apparatus 4 in response to the command signal.

The image generator 30f generates the augmented reality image AP by superimposing the guiding information and the information such as the icon based on the posted data set, on the captured image obtained by the camera controller 30a. The image generator 30f repeatedly generates the augmented reality image AP in a cycle (e.g. 1/30 sec.) same as a cycle in which the captured image is obtained.

The image transmission controller 30g controls the image transmitter 37 to transmit to the vehicle-mounted apparatus 2 the video signal that continuously includes the augmented reality image AP generated by the image generator 30f.

The display controller 30h controls the display 35 to display the posted content of the posted data set and the operation button 51 that receives the user operation, and the like, on the display 35. Furthermore, when the user touches the display 35 serving as the touch panel, the operation responding part 30i determines the content of the user operation and implements a process in accordance with the content of the user operation. The operation responding part 30i, for example, sets the setting parameter 38b in accordance with the user operation.

<3. SNS Outline>

Next explained is an outline of the social networking service (SNS) provided by the server apparatus 4. The SNS is a service for enhancing and supporting communications among users of the Internet. Twitter (registered trademark) and foursquare (registered trademark) are examples of the SNS.

Figure 4:
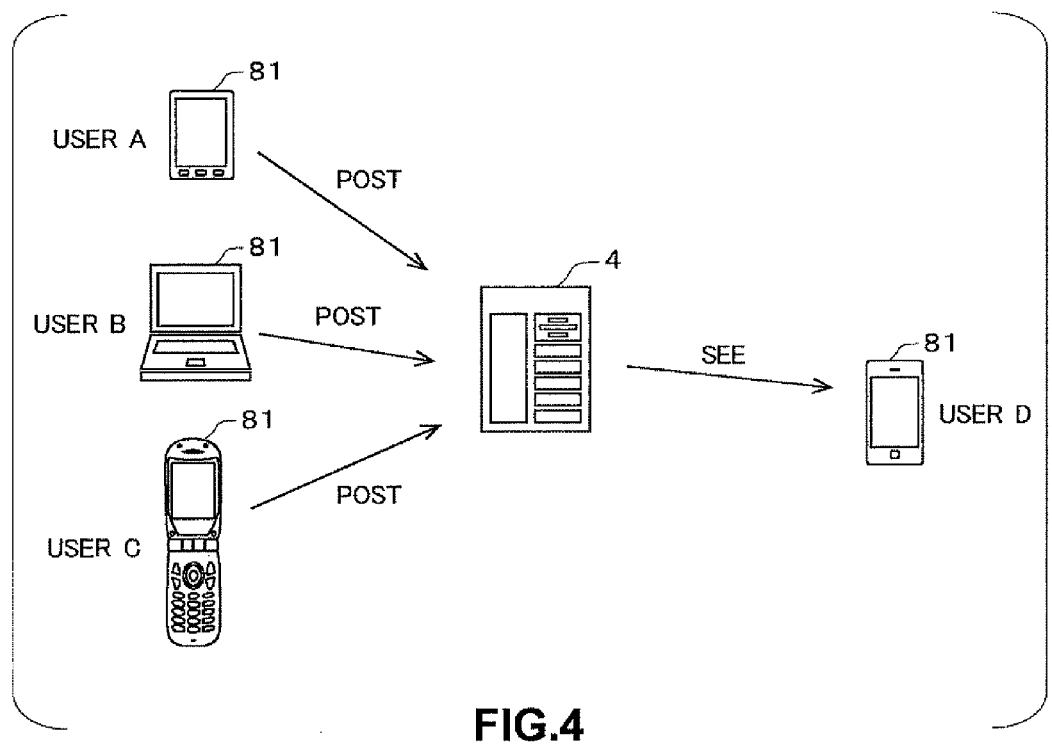
FIG. 4 illustrates an outline of a SNS.

FIG. 4 illustrates the outline of the SNS. In an explanation below, terms used in Twitter are arbitrarily indicated in parenthesis for convenience.

Each user of the SNS can post to the server apparatus 4 the posted data set (tweet) including the posted content configured by a relatively short text-based message, using the communication terminal 81 that the user owns. Such posted data sets are accumulated in the server apparatus 4. The posted content of the posted data set can include a hashtag in a form of "#tag name" generated by combining a predetermined code (e.g. #) with a tag name. The hashtag provides a particular attribution to the posted data set.

Moreover, when the communication terminal 81 that is used for posting includes a function of obtaining location information, such as GPS, it is possible that the posted data set includes the location information indicating a location at which the posted data set has been posted. Furthermore, when the communication terminal 81 that is used for posting includes a function of obtaining an image, such as a camera function, it is possible to attach an obtained image to the posted data set.

Each user of the SNS can see the posted contents of the posted data sets accumulated in the server apparatus 4, by using the communication terminal 81 that the user owns. Generally, the user can see the posted contents of the posted data sets of another designated (following) user. In addition, the user can cause the communication terminal 81 to obtain the posted data set that satisfies a specific obtaining condition, for example, a posted data set including a designated keyword or a designated hashtag, and can see the posted content of the obtained posted data set. The mobile apparatus 3 in this embodiment can be used as the communication terminal 81 for such a SNS.

In an example illustrated in FIG. 4, while users A, B and C are posting posted data sets to the server apparatus 4, a user D is seeing the posted data sets accumulated in the server apparatus 4. Naturally, the users A to C can see the posted data sets, and the user D can post a posted data set.

In such a way, the posted data sets are posted by users at various locations to the server apparatus 4 any time, and the posted data sets relating to the various locations are accumulated. Generally, the posted content of the posted data set is timely information of a location where the posted data set has been posted.

Figure 5:
FIG. 5 illustrates an example of a posted data set.

FIG. 5 illustrates an example of one posted data set TR that is accumulated in the server apparatus 4. As illustrated in FIG. 5, the posted data set TR includes information such as "posted data ID," "writer," "posted date and time," "posted content," "posted location," "attached image," etc.

The "posted data ID" is identification information for identifying the posted data set TR. The "writer" is a user who has posted the posted data set TR. The "posted date and time" is a date and time when the posted data set TR has been posted. The "posted content" is a text-based message that indicates a concrete posted content of the posted data set TR. The hashtag is arbitrarily included in "posted content."

Moreover, the "posted location" is location information where the posted data set TR has been posted. The "posted location" is represented in a longitude and a latitude. The "attached image" is an address of an image attached to the posted data set TR.

The mobile apparatus 3 of the display system 10 obtains, from the server apparatus 4, the posted data set posted in the vicinity of the vehicle 9 among the posted data sets accumulated in the server apparatus 4 as described above. Then the mobile apparatus 3 generates the augmented reality image AP that shows the posted location of the obtained posted data set.

<4. Augmented Reality Image>

Figure 6:
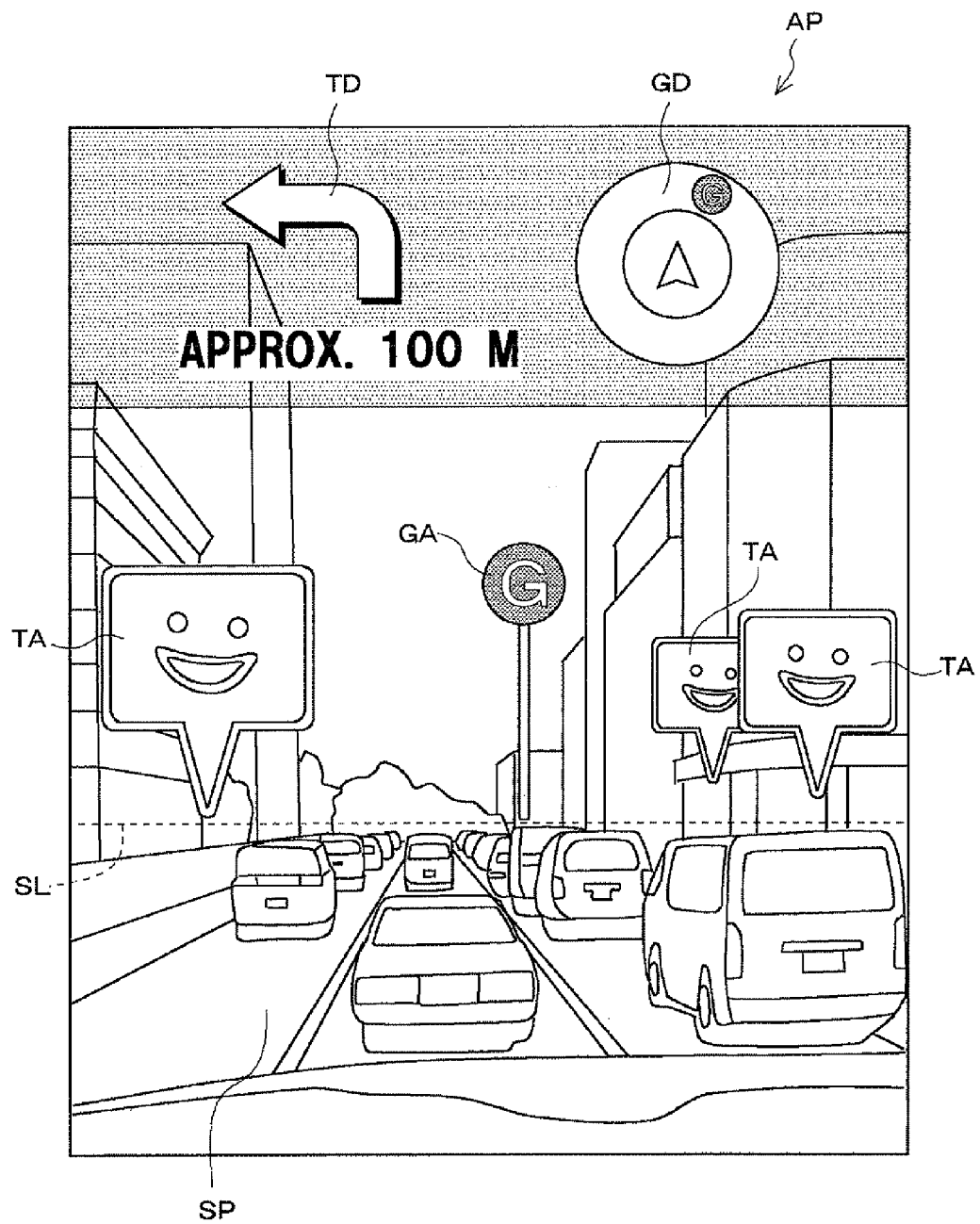
FIG. 6 illustrates an example of an augmented reality image.

Next explained is the augmented reality image AP generated by the mobile apparatus 3 and displayed on the vehicle-mounted apparatus 2. FIG. 6 illustrates an example of the augmented reality image AP. As described above, the image generator 30f of the mobile apparatus 3 generates the augmented reality image AP by superimposing information based on the guiding information and on the posted data set on a captured image SP that shows the real view of the front of the vehicle 9.

As illustrated in FIG. 6, the augmented reality image AP includes a turn direction guidance TD, a destination direction guidance GD, and a destination icon GA, as the information based on the guiding information. Among the guidances and the icon, each of the turn direction guidance TD and the destination direction guidance GD is disposed at a fixed position in a top portion of the augmented reality image AP. On the other hand, the destination icon GA is disposed in the augmented reality image AP in accordance with the destination location.

The turn direction guidance TD indicates the turn direction at the next guidance point and the distance to the next guidance point. Moreover, the destination direction guidance GD indicates a direction of the destination relative to the front direction of the vehicle 9. The destination direction guidance GD is generated based on the azimuth of the front direction of the vehicle 9 obtained by the direction obtaining part 30c and on the destination location included in the guiding information.

Furthermore, the destination icon GA is a pin-shaped icon and indicates the destination location in the real view shown by the captured image SR The destination icon GA is indicated in the augmented reality image AP only when the destination location is included in an objective capturing range of the camera 32.

A position of the destination icon GA in a lateral direction in the augmented reality image AP is determined based on the azimuth of the front direction of the vehicle 9 obtained by the direction obtaining part 30c and on the destination location included in the guiding information. As an angle between the front direction of the vehicle 9 and a direction of the destination viewed from the vehicle location is greater, the destination icon GA is indicated farther from a center in the lateral direction in the augmented reality image AR In the example illustrated in FIG. 6, a direction from the vehicle location to the destination is slightly right relative to the front direction of the vehicle 9. The user can instinctively understand the direction of the destination viewed from the vehicle 9, based on the destination icon GA indicated in the real view as described above.

In addition, the augmented reality image AP includes a post icon TA as information based on the posted data set. The post icon TA is a balloon-shaped icon and indicates the posted location of the posted data set in the real view shown by the captured image SP.

Figure 7:
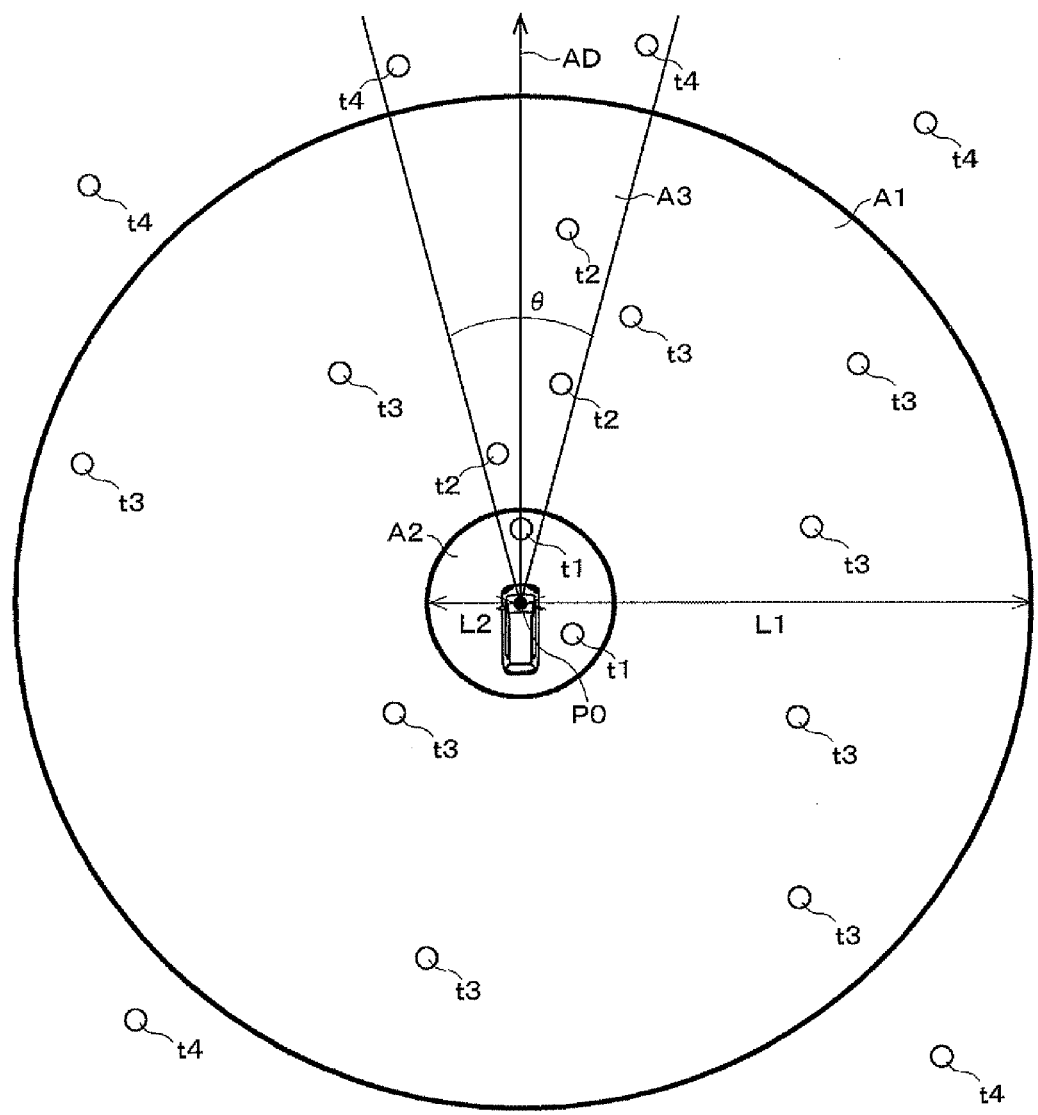
FIG. 7 illustrates posted locations of posted data sets.

FIG. 7 illustrates the posted locations of the posted data sets posted in the vicinity of the vehicle 9. FIG. 7 shows posted locations of posted data sets t1 to t4 relative to a vehicle location P0 of the vehicle 9 in a planar view. An arrow AD indicates the front direction of the vehicle 9.

When the augmented reality image AP is generated, the posted data set obtaining part 30e obtains the posted data sets from the server apparatus 4. The posted data set obtaining part 30e obtains, for example, up to latest 100 posted data sets that satisfy an obtaining condition that a distance from the vehicle location P0 to the posted location is less than a predetermined first distance L1. A condition that the posted data set includes a specific hashtag may be added to the obtaining condition on which the posted data set obtaining part 30e obtains the posted data sets.

Thus, the posted data set obtaining part 30e obtains only the posted data sets t1 to t3 posted in a range A1 having a radius L1 from the vehicle location P0, and does not obtain the posted data sets t4 posted outside the range A1. The first distance L1 is one of the user-settable setting parameters 38b, and is set in a range, for example, from 100 m to 20 km. (Details will be described later.)

Among the posted data sets t1 to t3 obtained as mentioned above, the image generator 30f superimposes only the post icon TA for the posted data set if the distance from the vehicle location P0 to the posted location is greater than a predetermined second distance L2, on the captured image SP. Therefore, the post icons TA for the posted data sets t1 posted in a second range A2 having the radius L2 from the vehicle location P0, are not included in the augmented reality image AP. The second distance L2 is set, for example, to 5 m.

A location relation between the vehicle location and the posted location of each of the posted data sets t1 posted very close to the vehicle 9 is easily changed. Therefore, if the post icons TA for the posted data sets t1 are included in the augmented reality image AP, positions of the post icons TA often change greatly in the augmented reality image AR Thus, the user notices the changes of the displayed positions of the post icons TA as flickers. As a result, visibility of the augmented reality image AP is deteriorated. Therefore, by excluding such a post icon TA for the posted data set t1 from superimposed objectives, the post icon TA can be smoothly displayed and the visibility of the augmented reality image AP can be improved.

As described above, the post icons TA for the posted data sets t2 and t3 are to be superimposed by the image generator 30f on the captured image SP because the distances from the vehicle location P0 to the posted locations of the posted data sets t2 and t3 are greater than the second distance L2 and less than the first distance L1. The image generator 30f superimposes actually on the captured image SP, the post icons TA for the posted data sets t2, among the posted data sets t2 and t3, of which posted locations are located in an objective capturing range A3 of the camera 32.

The objective capturing range A3 of the camera 32 is a range within an angle of view θ of the camera 32, of which a center line is the front direction of the vehicle 9 (i.e. the optical axis of the camera 32). The angle of view θ is, for example, 30 degrees. In other words, the objective capturing range A3 of the camera 32 is a range of a subject shown as an image in the captured image SP.

In a case of FIG. 7, the post icons TA for three posted data sets t2 included in the range A3 are superimposed on the captured image SR When the vehicle 9 turns (the front direction of the vehicle 9 is changed), the objective capturing range A3 of the camera 32 is changed. Accordingly, the posted data set of the post icon TA to be superimposed on the captured image SP is also changed.

A position of the post icon TA in the lateral direction in the augmented reality image AP is determined based on the azimuth of the front direction of the vehicle 9 obtained by the direction obtaining part 30c and on the posted location of the posted data set. When the posted location is located on a left side relative to the front direction of the vehicle 9, the post icon TA is indicated on a left side relative to a center in the lateral direction in the augmented reality image AP. When the posted location is located on a right side relative to the front direction of the vehicle 9, the post icon TA is indicated on a right side relative to the center in the lateral direction in the augmented reality image AP. Moreover, as an angle between the front direction of the vehicle 9 and a direction of the posted location from the vehicle location is greater, the post icon TA is indicated at a location further from the center in the lateral direction in the augmented reality image AP.

Thus, as shown in FIG. 6, the post icon TA is indicated at a position corresponding to the posted location of the posted data set in the real view in the augmented reality image AP. When seeing the augmented reality image AP, the user can instinctively understand the posted location of the posted data set posted in the vicinity of the vehicle 9, based on the post icon TA indicated in the real view as mentioned above.

Moreover, a position of the post icon TA in a vertical direction (position of a lower end portion) in the augmented reality image AP is determined based on a standard line SL that is a standard for positioning in the vertical direction and on a distance from the vehicle location to the posted location. In FIG. 6, the standard line SL is indicated by a dashed line for convenience in explanation. However, such a line is not actually included in the augmented reality image AP. The standard line SL is one of the user-settable setting parameters 38b. (Details are described later.) The position of the destination icon GA in the vertical direction (position of a lower end portion) is also determined based on the standard line SL.

Figure 8:
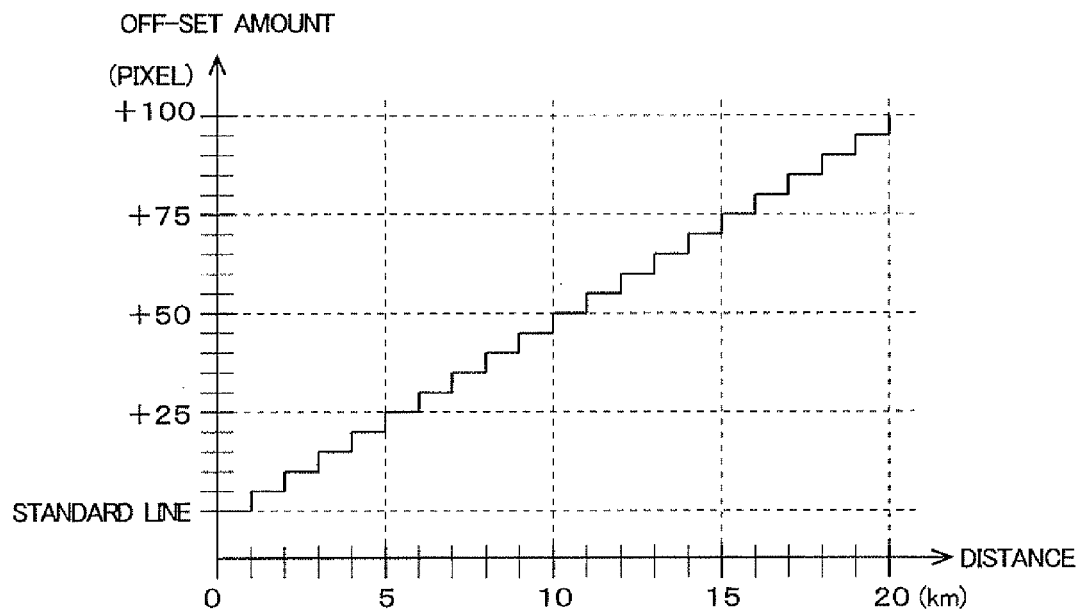
FIG. 8 illustrates a relation between a distance to a posted position and an off-set amount.

As the distance from the vehicle location to the posted location of the posted data set is greater, the post icon TA for the posted data set is indicated at a position higher from the standard line SL in the augmented reality image AR FIG. 8 illustrates a relation between a distance (km) from the vehicle location to the posted location and an off-set amount (pixel) that is a shift amount of the position of the post icon TA from the standard line SL. As illustrated in FIG. 8, the position of the post icon TA shifts upward by 5 pixels for each kilometer of the distance from the vehicle location to the posted location. In such a way, visibility is secured even when a plurality of the post icons TA are overlapped one another.

Figure 9:
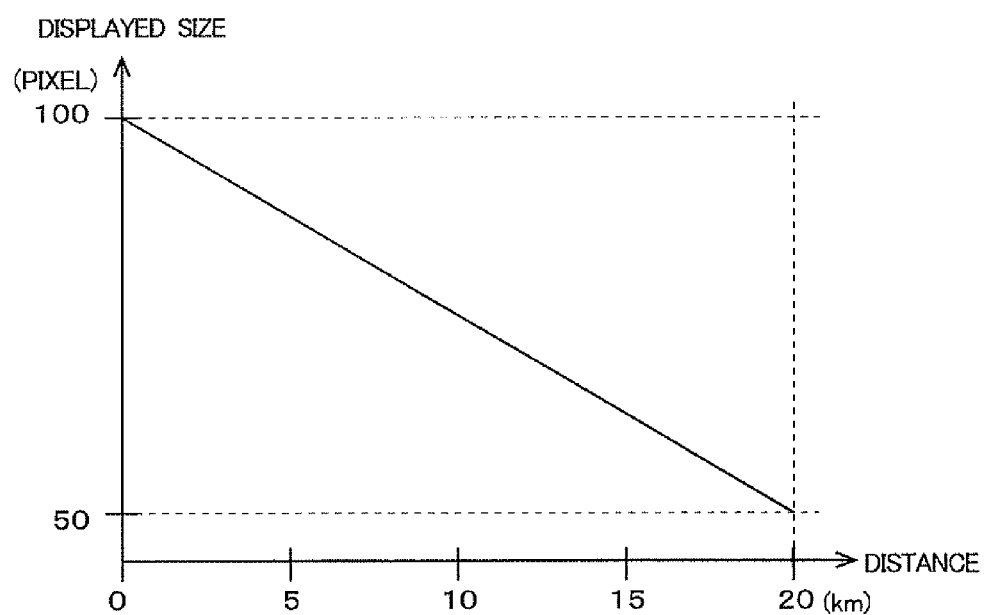
FIG. 9 illustrates a relation between a distance to a posted position and a displayed size.

Moreover, a size of the post icon TA displayed in the augmented reality image AP is determined based on the distance from the vehicle location to the posted location. As the posted data set has a greater distance from the vehicle location to the posted location, the displayed size of the post icon TA for the posted data set is made smaller. FIG. 9 illustrates a relation between the distance (km) from the vehicle location to the posted location and a displayed size (pixel) of one side of the post icon TA. As illustrated in FIG. 9, the displayed size of the post icon TA is made smaller linearly, in accordance with the distance from the vehicle location to the posted location. Thus, the displayed size of the post icon TA for the posted data set posted at a location far from the vehicle 9 becomes relatively small. Therefore, perspective can be given to the post icon TA in the augmented reality image AP. As a result, the user who sees the augmented reality image AP can instinctively understand the distance to the posted location of the posted data set.

Moreover, if there are a plurality of the post icons TA to be superimposed on the captured image SP, the image generator 30f superimposes the post icons TA for the posted data sets in a z order (order of layers) such that the post icon TA for a posted data set that is closer to the vehicle location is in front of the icon for a posted data set that is farther from the vehicle location. (Refer to FIG. 6.) Thus, since the post icons TA for the posted data sets posted at locations closer to the vehicle 9 are shown more in front, it is easier for the user who sees the augmented reality image AP to understand the posted data sets posted at locations close to the vehicle 9. Moreover, if there are the posted data sets that have a same distance from the vehicle location to the posted locations, the image generator 30f may superimpose the post icons TA for the posted data sets in the z order such that the icon for a posted data set having less elapsed time from a posted time point to a current time point is in front of the icon for a posted data set having more elapsed time from the posted time point to the current time point.

However, the image generator 30f may superimpose the posted data sets, regardless of the distance from the vehicle location to the posted location in a z order such that the icon for a posted data set having less elapsed time from the posted time point to the current time point is in front of the icon for a posted data set having more elapsed time from the posted time point to the current time point. Thus, the post icons TA for newer posted data sets are displayed more in front in the augmented reality image AP. Therefore, it becomes easier for the user who sees the augmented reality image AP to understand a newest posted data set.

<5. Display on Mobile Apparatus>

Figure 10:
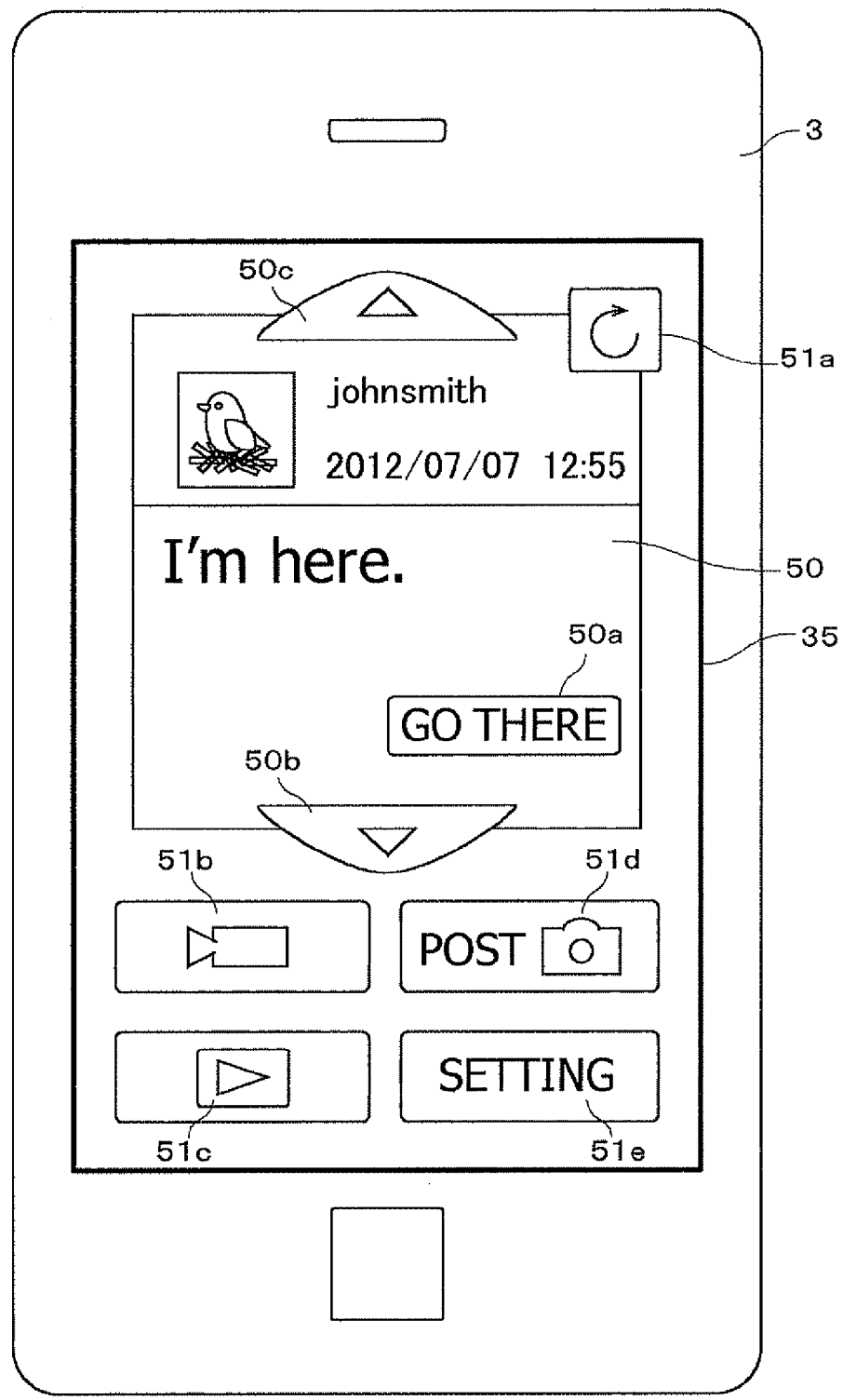
FIG. 10 illustrates an example displayed on a display of a mobile apparatus.

Next, a displayed content on the display 35 of the mobile apparatus 3 is explained. FIG. 10 illustrates an example displayed on the display 35 of the mobile apparatus 3.

The display 35 of the mobile apparatus 3 displays the window 50 that shows the posted content of the posted data set by a control of the display controller 30h. A concrete posted content of one posted data set obtained by the posted data set obtaining part 30e is displayed on the window 50. By seeing the display 35 of the mobile apparatus 3, the user can understand the posted content of the posted data set.

Moreover, not being included in the augmented reality image AP, such a posted content of the posted data set is not displayed on the vehicle-mounted apparatus 2. Therefore, when the posted content of the posted data set is provided to the user, the display of the augmented reality image AP on the vehicle-mounted apparatus 2 which the driver of the vehicle 9 mainly sees is not interfered.

If there are a plurality of the posted data sets obtained by the posted data set obtaining part 30e, the display 35 preferentially displays the posted content of the posted data set having a smaller distance from the vehicle location to the posted location, by the control of the display controller 30h.

The display 35 of the mobile apparatus 3 first displays the posted content of the posted data set posted at a location closest to the vehicle 9. Then when the user touches a lower button 50b that is an operation button attached to the window 50, the display 35 displays a posted content of a posted data set posted at a location next closest to the vehicle 9. Thus, the user of the mobile apparatus 3 can see the posted contents of the posted data sets in an ascending order of the distance from the vehicle location to the posted location. Therefore, the user of the mobile apparatus 3 can easily see the posted content of the posted data set posted at a location close to the vehicle 9 by few operations. If there are the posted data sets that have a same distance from the vehicle location to the posted locations, the display 35 may preferentially display the posted content of the posted data set having less elapsed time from the posted time point to the current time point.

However, the display 35 may preferentially display the posted contents of the posted data sets having less elapsed time from the posted time points to the current time point, regardless of the distance from the vehicle location to the posted location. Thus, the user of the mobile apparatus 3 can easily see the posted content of a new posted data set with fewer operations.

Moreover, the post icon TA corresponding to the posted data set of which the posted content is being displayed on the mobile apparatus 3 may be displayed in a style different from a style of other post icons TA in the augmented reality image AP. Thus, the user can instinctively understand the posted location of the posted data set of which the posted content is being displayed on the mobile apparatus 3.

An upper button 50c and a location determination button 50a are further attached to the window 50, as operation buttons that receive user operations. When the user touches the upper button 50c, the posted content of the posted data set is displayed on the window 50 in an order opposite to the order in which the posted content is displayed when the user touches the lower button 50b. Moreover, when the user touches the location determination button 50a indicating "Go there," the posted location of an applicable posted data set is transmitted to another application such as a map application. Thus, the user can confirm the posted location of the posted data set, using the application such as a map application. Moreover, it may be designed that the posted location of the posted data set is transmitted to the vehicle-mounted apparatus 2, and then the posted location of the posted data set is set as a destination to the navigation function of the vehicle-mounted apparatus 2, when the user touches the location determination button 50a.

The display 35 of the mobile apparatus 3 displays an update button 51a, a motion picture capturing button 51b, a motion picture playback button 51c, a posting button 51d, and a setting button 51e, in addition to the window 50, as operation buttons that receive user operations relating to a content of the augmented reality image AP, by the control of the display controller 30h. Being not included in the augmented reality image AP, such operation buttons are not displayed on vehicle-mounted apparatus 2. Therefore, since the display of these operation buttons does not interfere with display of the augmented reality image AP on the vehicle-mounted apparatus 2, the user (mainly the driver of the vehicle 9) who sees the vehicle-mounted apparatus 2 can fully understand situations and the like in the vicinity of the vehicle 9.

When the user touches the update button 51a, the posted data set obtaining part 30e updates the posted data sets. In other words, the posted data set obtaining part 30e eliminates obtained posted data sets and then obtains new posted data sets that satisfy the obtaining condition, from the server apparatus 4.

When the user touches the motion picture capturing button 51b, the camera 32 obtains motion picture data that shows the front of the vehicle 9 by the control of the camera controller 30a. Moreover, when the user touches the motion picture playback button 51c, the motion picture data obtained by the camera 32 is played and displayed on the display 35.

When the user touches the posting button 51d, the camera 32 generates a still image that shows the front of the vehicle 9 by the control of the camera controller 30a. Then a posted data set of which the posted content is a predetermined fixed phrase (e.g. "I'm here.") attached with the obtained still image is posted to the SNS.

Furthermore, when the user touches the setting button 51e, the display 35 displays a setting screen for setting the setting parameter 38b by the control of the operation responding part 30i. The user can change the setting parameter 38b by an operation made with the setting screen.

Figure 11:
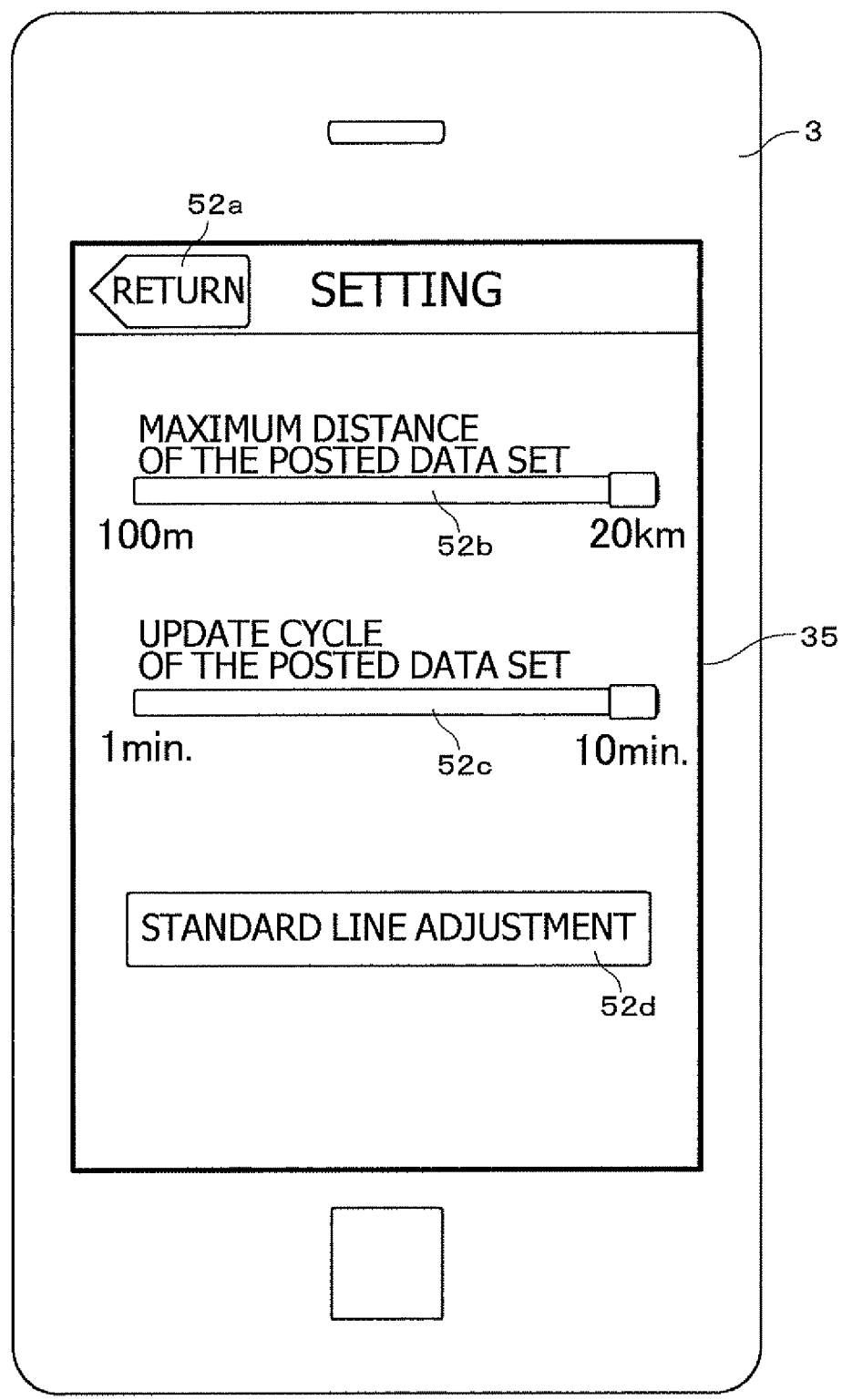
FIG. 11 illustrates a setting screen.

FIG. 11 illustrates the setting screen displayed on the display 35 of the mobile apparatus 3. The setting screen includes a return button 52a, a distance setting slider 52b, an update cycle slider 52c, and a standard line adjustment button 52d.

When the user touches the return button 52a, the setting parameter 38b set on the setting screen is stored to the storage 28, and the setting parameter 38b is used for a process implemented after the setting. In this case, the display 35 returns to a state in which the posted content of the posted data set is displayed. (Refer to FIG. 10.)

The distance setting slider 52b is used to set the first distance L1 that is a limit of the distance from the vehicle location to the posted location within which the posted data set is obtained. The user can set the first distance L1 within a range from 100 m to 20 km by moving a knob of the distance setting slider 52b.

As described above, the user can set the first distance L1. Thus, the user can adjust the posted data set displayed as the post icon TA in the augmented reality image AP, depending on a traveling speed, a traveling area, etc. of the vehicle 9. For example, when the vehicle 9 travels on a highway, etc and when the vehicle speed of the vehicle 9 is relatively high, the user tends to pay more attention to the posted data set posted at a location distant from the vehicle 9 than the posted data set posted in a location close to the vehicle 9. Therefore, in this case, the post icon TA for the posted data set posted in the location distant from the vehicle 9 can be displayed by increasing the first distance L1.

The update cycle slider 52c is used to set an updating cycle in which the posted data set obtaining part 30e updates the posted data sets. The user can set the updating cycle in a range from 1 minute to 10 minutes by moving a knob of the update cycle slider 52c.

Moreover, when the user touches the standard line adjustment button 52d, the display 35 displays a line adjustment screen for setting the standard line SL, by the control of the operation responding part 30i. As described above, the standard line SL serves as the standard for the position in the vertical direction used when the post icon TA and the destination icon GA are superimposed on the captured image SP.

Figure 12:
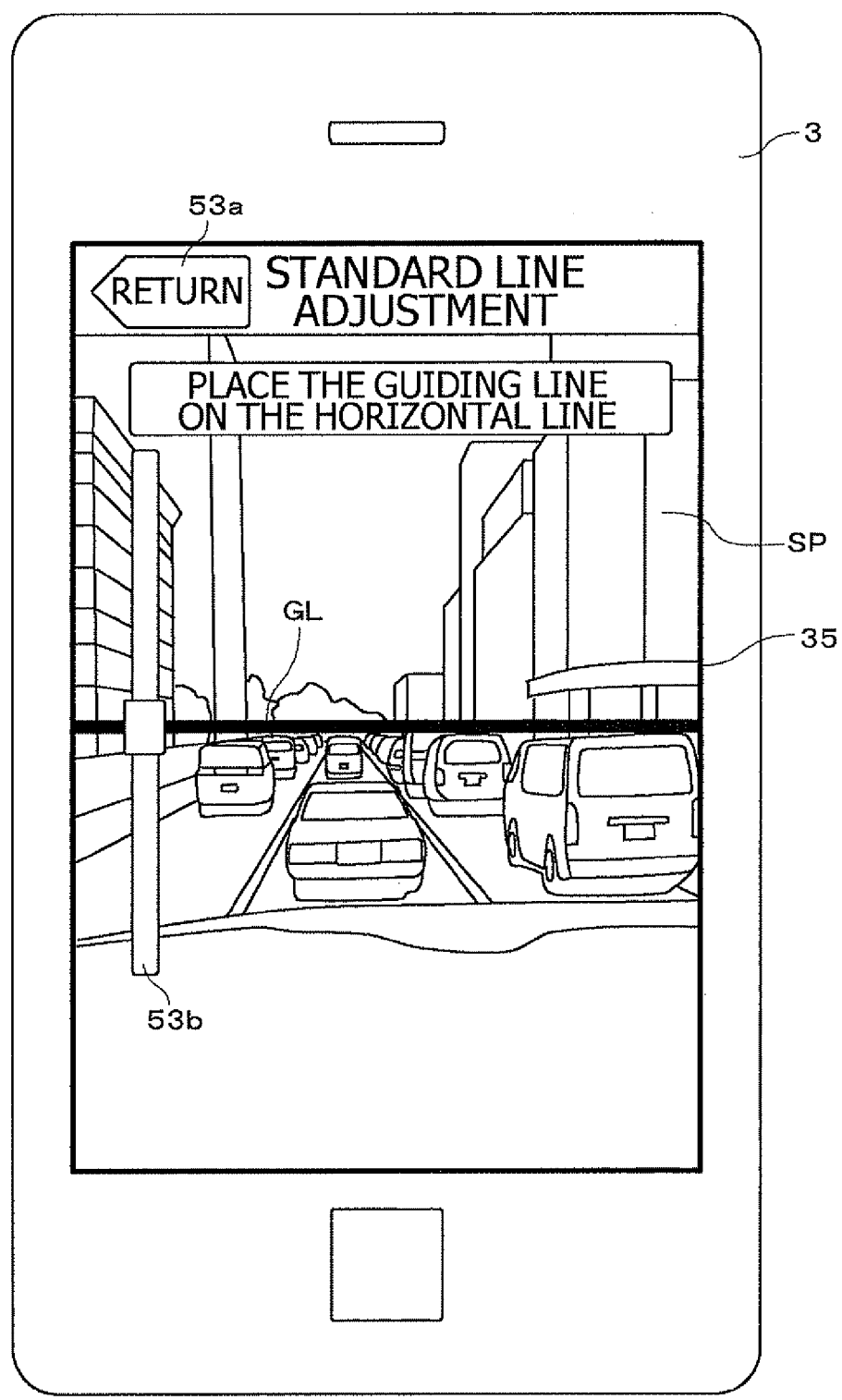
FIG. 12 illustrates a line adjustment screen.

FIG. 12 illustrates the display 35 of the mobile apparatus 3 showing the line adjustment screen. The line adjustment screen includes a return button 53a and a line adjustment slider 53b.

When the user touches the return button 53a, a position of the standard line SL set on the line adjustment screen is stored to the storage 28 and the set standard line SL is used for a process implemented after the setting. In this case, the display 35 returns to a state in which the setting screen is displayed. (Refer to FIG. 11.)

The line adjustment slider 53b is used to set the standard line SL. The line adjustment screen includes the captured image SP that shows the real view of the front of the vehicle 9. The user can move up and down a guiding line GL that moves in conjunction with the knob of the line adjustment slider 53b, by moving the knob up and down. A position of the guiding line GL is set as a position of the standard line SL. Referring to the captured image SP, the user sets the standard line SL to a horizon line of the real view shown by the captured image SP.

The horizontal line in the captured image SP changes depending on a height or a lean of the mobile apparatus 3 fixed by the holder 12. When a position of the standard line SL is greatly different from a position of the horizontal line in the captured image SP, the post icon TA, the destination icon GA, etc. are displayed at unnatural positions in the real view.

Figure 13:
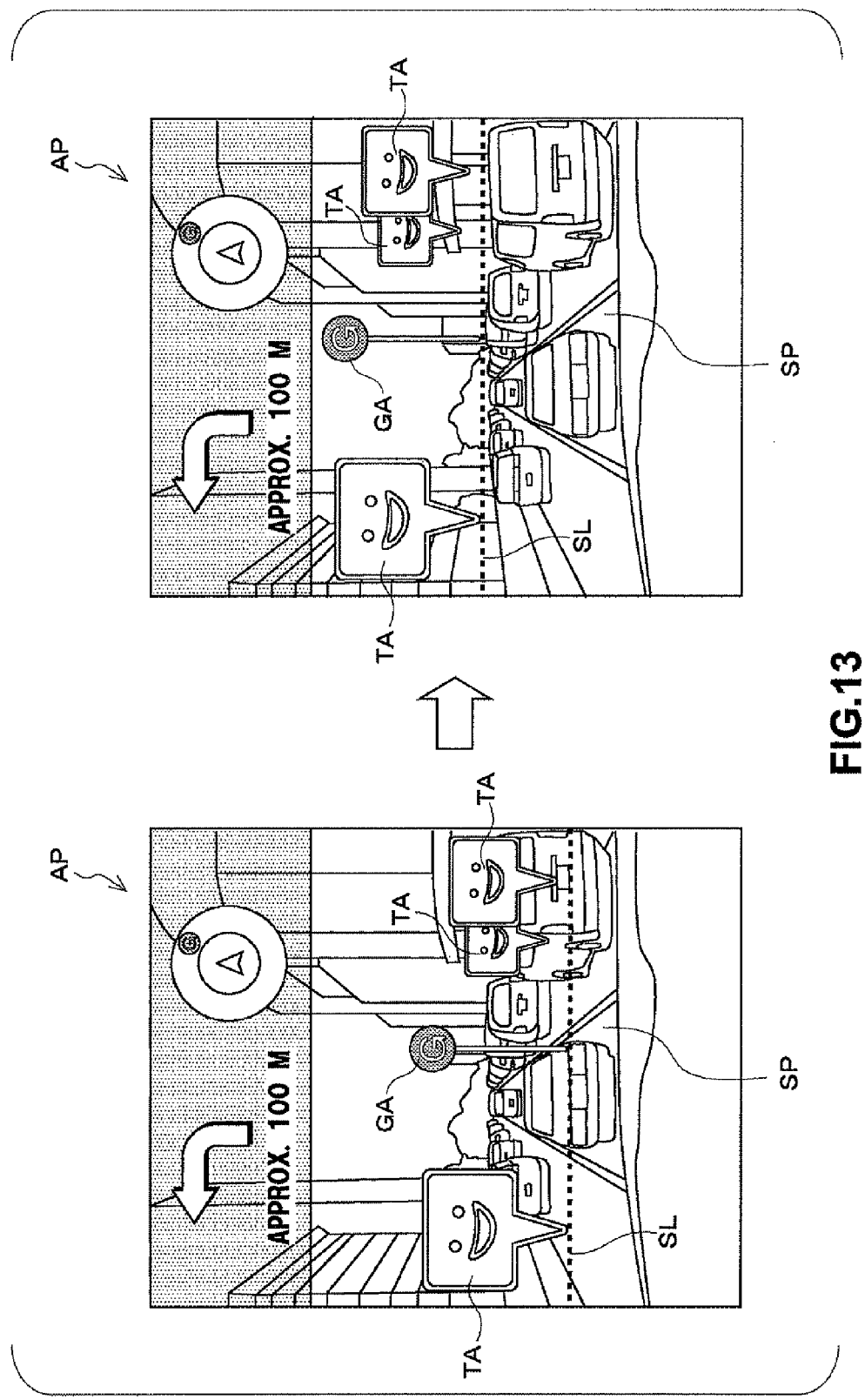
FIG. 13 is a drawing for explaining adjustment of a standard position.

For example, as shown in a left drawing in FIG. 13, when the standard line SL is placed lower than the horizontal line in the captured image SP, the augmented reality image AP gives an impression that the post icon TA and the destination icon GA are buried in the ground. Therefore, by moving and placing the standard line SL to substantially fit on the horizontal line in the captured image SP, as shown in a right drawing in FIG. 13, the post icon TA and the destination icon GA in the augmented reality image AP can be shown at natural positions in the real view.

As described above, since it is possible to set the standard line SL that is the standard for the positioning in the vertical direction used to superimpose the post icon TA and the destination icon GA, the post icon TA and the destination icon GA can be placed in easy-to-see positions regardless of the height or the lean of the mobile apparatus 3 fixed to the vehicle 9.

<6. Flow of Process>

Figure 14:
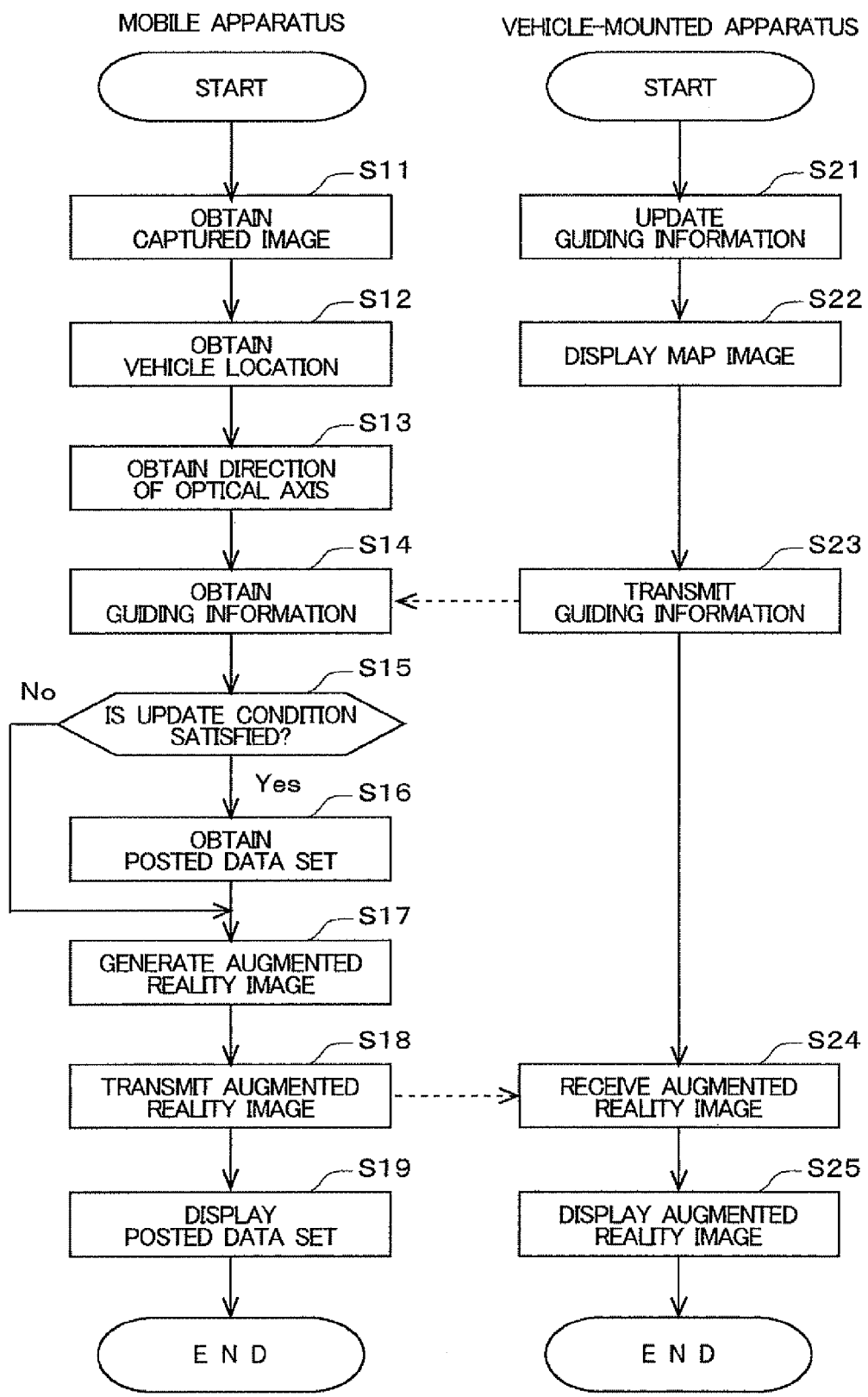
FIG. 14 illustrates flowcharts of basic processes implemented in the display system.

Next, flowcharts of processes in the display system 10 are explained. FIG. 14 illustrates the flowcharts of the basic processes implemented in the display system 10. A left drawing in FIG. 14 illustrates a process implemented in the mobile apparatus 3, and a right drawing in FIG. 14 illustrates a process implemented in the vehicle-mounted apparatus 2. At starting points of the processes, the vehicle-mounted apparatus 2 and the mobile apparatus 3 have completed initial processes for communications and can operate, being connected with one another. Moreover, a destination is set to the vehicle-mounted apparatus 2, and a route leading to the destination has been derived. The processes shown in FIG. 14 are repeated in a predetermine cycle (e.g. ⅟30 sec.).

First, the process implemented in the mobile apparatus 3 is explained. The camera controller 30*a* of the mobile apparatus 3 controls the camera 32 to obtain the captured image that shows the real view of the front of the vehicle 9 (a step S11).

Next, the location obtaining part 30*b* controls the GPS part 33 to obtain the vehicle location of the vehicle 9 at a current time point (a step S12). The location obtaining part 30*b* may obtain the vehicle location obtained by the GPS part 23 in the vehicle-mounted apparatus 2, from the vehicle-mounted apparatus 2 via the inter-apparatus communication part 36.

Next, the direction obtaining part 30*c* controls the azimuth sensor 34 to obtain a direction of the optical axis of the camera 32, i.e. the front direction of the vehicle 9 at the current point as a vehicle direction (a step S13). The direction obtaining part 30*c* may obtain the front direction of the vehicle 9 obtained by the azimuth sensor 24 in the vehicle-mounted apparatus 2, as the direction of the optical axis of the camera 32, from the vehicle-mounted apparatus 2 via the inter-apparatus communication part 36.

Next, the guiding information obtaining part 30*d* controls the inter-apparatus communication part 36 to obtain the guiding information relating to the navigation function from the vehicle-mounted apparatus 2 (a step S14). The guiding information obtaining part 30*d* transmits the command signal to the vehicle-mounted apparatus 2 via the inter-apparatus communication part 36, and obtains the guiding information transmitted from the vehicle-mounted apparatus 2 in response to the command signal. The guiding information includes the destination location, the turn direction at a next guidance point, the distance to the next guidance point, etc.

Next, the posted data set obtaining part 30*c* determines whether or not an update condition is satisfied, for example, whether or not a time period equivalent to one update cycle has passed from a time point at which the posted data set obtaining part 30*e* has obtained a previous posted data set, or whether or not the user has touched the update button 51*a* (a step S15). When the update condition is not satisfied, the process moves to a step S17.

When the update condition is satisfied (Yes in the step S15), the posted data set obtaining part 30*e* controls the network communication part 31 to transmit the command signal to the server apparatus 4 and obtains the posted data sets transmitted from the server apparatus 4 in response to the command signal (a step S16). The posted data set obtaining part 30*e* obtains, for example, 100 latest posted data sets that satisfy an obtaining condition that a distance from the vehicle location to the posted location is less than the first distance L1.

Next, the image generator 30*f* generates the augmented reality image AP, using the captured image SP and the variety of information obtained in the steps S11 to S16 (a step S17). The image generator 30*f* superimposes the turn direction guidance TD, the destination direction guidance GD, and the destination icon GA on the captured image SP, based on the guiding information, the vehicle location, and the vehicle direction. Moreover, the image generator 30*f* superimposes the post icon TA on the captured image SP, based on the posted data set, the vehicle location, and the vehicle direction. Thus, the image generator 30*f* generates the augmented reality image AP in which the turn direction guidance TD, the destination direction guidance GD, the destination icon GA, and the post icon TA are added to the captured image SP that shows the real view.

Next, the image transmission controller 30*g* controls the image transmitter 37 to transmit the augmented reality image AP generated by the image generator 30*f* as one frame of the video signal, to the vehicle-mounted apparatus 2 (a step S18).

Next, the display controller 30*h* controls the display 35 to display the posted content of the posted data set on the display 35 (a step S19). The display controller 30*h* preferentially displays the posted content of the posted data set having a smaller distance from the vehicle location to the posted location.

Next, the process implanted in the vehicle-mounted apparatus 2 is explained. First, the navigation part 20*a* of the vehicle-mounted apparatus 2 updates the guiding information relating to the navigation function. The navigation part 20*a* updates the guiding information to latest information based on the vehicle location obtained by the GPS part 23, the front direction of the vehicle 9 obtained by the azimuth sensor 24, the route, etc. (a step S21).

Next, the navigation part 20*a* generates the map image MP that shows a map, having the updated guiding information, of the vicinity of the vehicle 9. The display controller 20*b* displays the map image MP generated by the navigation part 20*a* as mentioned above on one side (left side) of the screen of the display 25 (a step S22).

Moreover, the navigation part 20*a* controls the inter-apparatus communication part 26 to transmit the latest guiding information to the mobile apparatus 3 in response to the command signal demanding the guiding information transmitted from the mobile apparatus 3 (a step S23).

In addition, the image receiver 27 receives the video signal including the augmented reality image AP from the mobile apparatus 3 (a step S24). The display controller 20*b* displays the augmented reality image AP included in the video signal on the other side (right side) of the display 25 (a step S25).

Thus, the vehicle-mounted apparatus 2 displays the augmented reality image AP generated by superimposing the post icon TA representing the posted data set posted in the objective capturing range of the camera 32 that has generated the captured image SP, on the captured image SP that shows the real view of the vicinity of the vehicle 9. Therefore, the user who sees the vehicle-mounted apparatus 2 can instinctively understand the posted location of the posted data set. The map image MP and the augmented reality image AP are displayed side by side on the same screen of the display 25. (Refer to FIG. 2.)

<7. Mobile Apparatus being Disconnected>

The explanation described above explains a case where the vehicle-mounted apparatus 2 and the mobile apparatus 3 operate, being connected with one another. However, even when being not connected with the vehicle-mounted apparatus 2, the mobile apparatus 3 generates the augmented reality image AP. When the mobile apparatus 3 is disconnected with the vehicle-mounted apparatus 2, the augmented reality image AP is displayed on the display 35.

Figure 15:
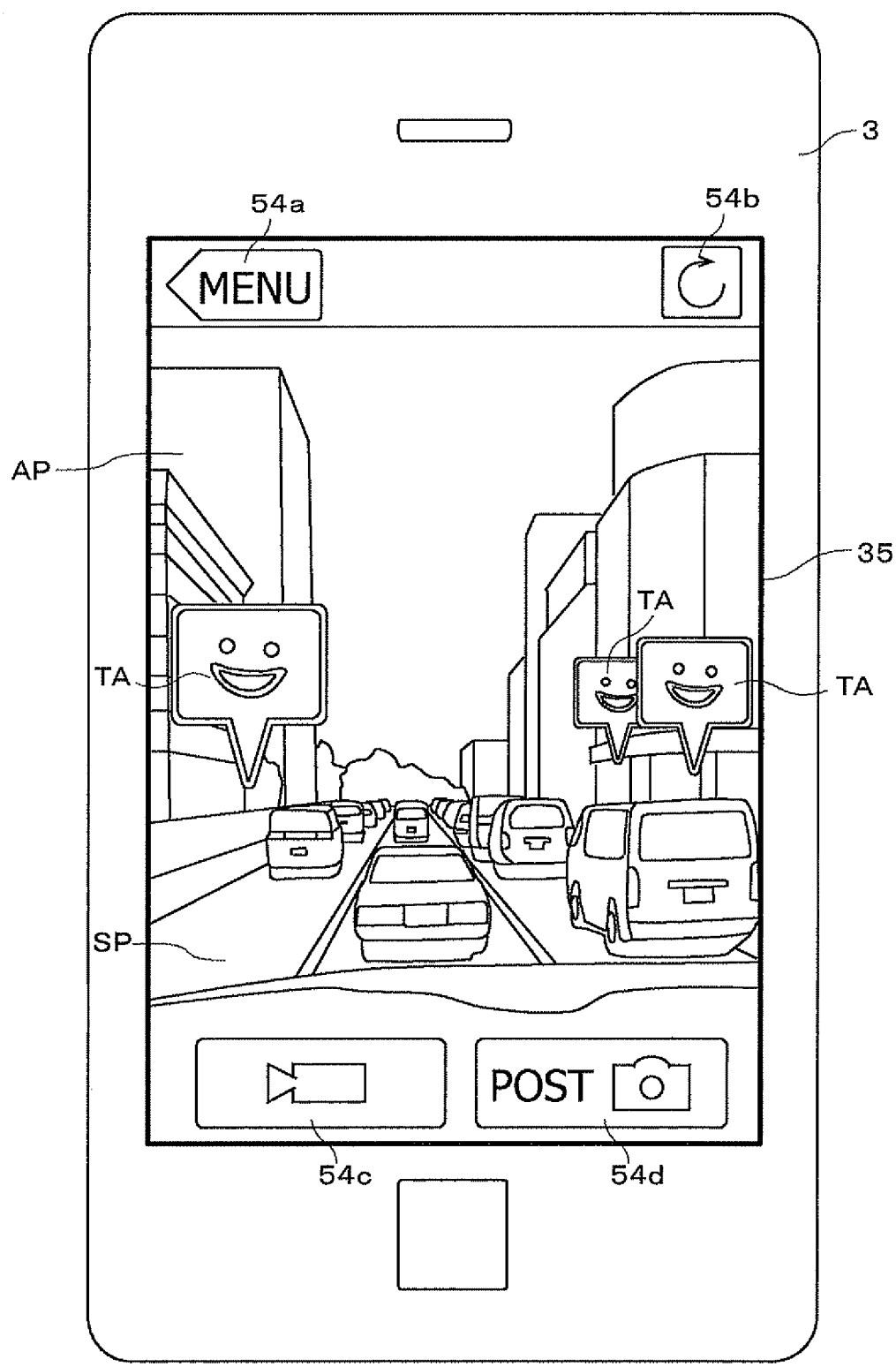
FIG. 15 illustrates an example screen displayed on the display of the mobile apparatus being disconnected.

FIG. 15 illustrates an example screen displayed on the display 35 of the mobile apparatus 3 being disconnected with the vehicle-mounted apparatus 2. In this case, the augmented reality image AP is displayed on the display 35.

Since the mobile apparatus 3 cannot obtain the guiding information from the vehicle-mounted apparatus 2 when being disconnected, the augmented reality image AP does not include the turn direction guidance TD, the destination direction guidance GD and the destination icon GA. On the other hand, even when the mobile apparatus 3 is disconnected with the vehicle-mounted apparatus 2, the augmented reality image AP includes the post icon TA showing the posted location of the posted data set. The post icon TA is superimposed on the captured image SP in a process similar to the process implemented when the mobile apparatus 3 is connected with the vehicle-mounted apparatus 2, as described above. The user can instinctively understand the posted location of the posted data set by seeing such an augmented reality image AR Moreover, the display 35 displays a menu button 54a, an update button 54b, a motion picture capturing button 54c, and a posting button 54d, in addition to the augmented reality image AR Function of the update button 54b, the motion picture capturing button 54c, and the posting button 54d are the same as the functions of the update button 51a, the motion picture capturing button 51b, and the posting button 51d used when the mobile apparatus 3 is connected with the vehicle-mounted apparatus 2, as described above.

When the user touches the menu button 54a, the display 35 displays a menu screen that receives various operations. The user can, for example, set the setting parameter 38b and give an instruction such as playback of the motion picture data, by the operation made with the menu screen. The setting parameter 38b such as the first distance L1 and the standard line SL can be set in the same way as when the mobile apparatus 3 is connected with the vehicle-mounted apparatus 2 as described above.

Figure 16:
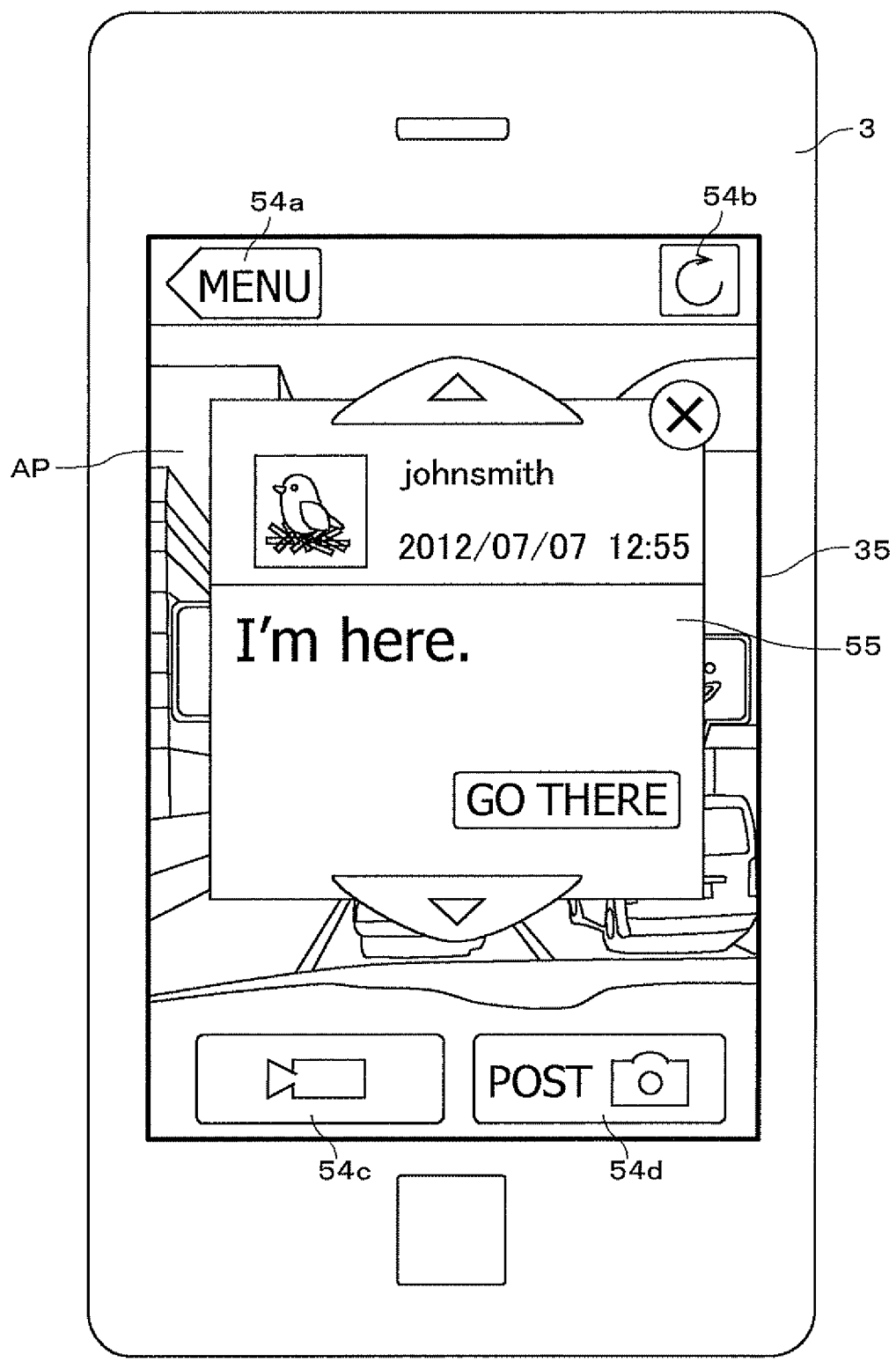
FIG. 16 illustrates an example screen displayed on the display of the mobile apparatus being disconnected.

Moreover, the post icon TA included in the augmented reality image AP is also capable of receiving a user operation. When the user touches the post icon TA, the display 35 displays a window 55 that indicates the posted content of the posted data set in the augmented reality image AP, in front, as illustrated in FIG. 16. Thus, the user of the mobile apparatus 3 can see the posted content of the posted data set. In this case also the posted content of the posted data set having a smaller distance from the vehicle location (the location of the mobile apparatus 3 at a current time point) to the posted location is preferentially displayed on the display 35.

<8. Modification>

The embodiment of the invention is described above. The invention is not limited to the embodiment described above, but various modifications are possible. Hereinafter, examples of such a modification will be described. All embodiments including the embodiments described above and below can be arbitrarily combined.

In the aforementioned embodiment, the vehicle-mounted apparatus 2 is connected to the mobile apparatus 3 via the signal cable 11, and receives and transmits the data signal and the video signal from/to the mobile apparatus 3 via wire communication. On the other hand, the data signal and the video signal may be communicated between the apparatuses via wireless communications.

Moreover, in the aforementioned embodiment, the augmented reality image AP includes the destination icon GA showing the location of the destination being set at a current time point. In addition, the augmented reality image AP may include a history icon that shows a destination set in the past.

Furthermore, in the aforementioned embodiment, the image generator 30f superimposes the post icon TA for the posted data set t2 of which the posted location is included in the range of the angle of view θ of the camera 32, on the captured image SP. However, the image generator 30f may superimpose the post icon TA for the posted data set t2 of which the posted location in a range slightly wider than the angle of view θ of the camera 32 (e.g. wider by 5 degrees to right and left sides), on the captured image SP. Thus, the post icon TA for the posted data set posted at a location corresponding to an area close to a left edge and a right edge of the captured image SP, can be smoothly displayed.

In addition, in the aforementioned embodiment, the optical axis of the camera 32 faces the front direction of the vehicle 9. However the optical axis of the camera 32 may face a direction other than the front direction, for example, a side direction or a rear direction of the vehicle 9. When the optical axis of the camera 32 faces the rear direction, the augmented reality image AP can indicate the posted location of the posted data set in a rear real view of the vehicle 9.

Moreover, traveling information relating to travel of the vehicle 9 may be transmitted from the vehicle-mounted apparatus 2 to the mobile apparatus 3, and the posted content of the posted data set and one or more of the operation buttons may not be displayed on the mobile apparatus 3 during traveling of the vehicle 9.

Furthermore, the display 25 of the vehicle-mounted apparatus 2 may include a touch panel and may be capable of receiving a user operation. In addition, in the aforementioned embodiment, the command buttons that receive a user operation relating to the content of the augmented reality image AP are not included in the augmented reality image AP and are not displayed on the vehicle-mounted apparatus 2. However, a part of such command buttons may be displayed on the vehicle-mounted apparatus 2. In this case, the command buttons displayed on the mobile apparatus 3 may not be displayed on the vehicle-mounted apparatus 2. Thus the screen of the display 25 of the vehicle-mounted apparatus 2 can be utilized effectively.

In the aforementioned embodiment, a part or all of the camera controller 30a, the location obtaining part 30b, the direction obtaining part 30c, the guiding information obtaining part 30d, the posted data set obtaining part 30e, the image generator 30f, the image transmission controller 30g, the display controller 30h, and the operation responding part 30i all of which are explained as application functions of the mobile apparatus 3, may be functions of the vehicle-mounted apparatus 2.

Further, the aforementioned embodiment explains that the various functions are implemented by software by implementing the arithmetic processing of CPU in accordance with the program. However, a part of the functions may be implemented by an electrical hardware circuit.

While the invention has been shown and described in detail, the foregoing description is in all aspects illustrative and not restrictive. It is therefore understood that numerous other modifications and variations can be devised without departing from the scope of the invention.

What is claimed is:

1. A display system that includes a vehicle-mounted apparatus for being mounted on a vehicle and a portable mobile apparatus configured to communicate with the vehicle-mounted apparatus, the display system comprising:
   a camera that generates a captured image of a vicinity of the vehicle;
   a location obtaining part that obtains a vehicle location of the vehicle;
   a direction obtaining part that obtains a direction of an optical axis of the camera;
   a data obtaining part that obtains a posted data set of a social networking service;
   an image generator configured to generate an augmented reality image by superimposing, on the captured image generated by the camera, an icon representing the posted data set posted in an objective capturing range of the camera, which is an angle of view of the camera, based on a posted location of the posted data set, the vehicle location, and the direction of the optical axis of the camera, the image generator superimposing the icon on the captured image only for the posted data set within the angle of view of the camera and excluding from superimposing the icon on the captured image for any posted data set not within the angle of view of the camera;
a display, included in the vehicle-mounted apparatus, configured to display the augmented reality image; and
a line setting part that sets, in accordance with a user operation, a standard line serving as a standard for a position in a vertical direction for superimposing the icon on the captured image.

2. The display system according to claim 1, wherein
the camera is included in the mobile apparatus; and
the display system further comprises
a holder that holds the mobile apparatus in the vehicle such that the camera generates the captured image of the vicinity of the vehicle.

3. A portable mobile apparatus configured to communicate with a vehicle-mounted apparatus that is mounted on a vehicle, the mobile apparatus comprising:
a camera that generates a captured image of a vicinity of the vehicle;
a location obtaining part that obtains a vehicle location of the vehicle;
a direction obtaining part that obtains a direction of an optical axis of the camera;
a data obtaining part that obtains a posted data set of a social networking service;
an image generator configured to generate an augmented reality image by superimposing, on the captured image generated by the camera, an icon representing the posted data set posted in an objective capturing range of the camera, which is an angle of view of the camera, based on a posted location of the posted data set, the vehicle location, and the direction of the optical axis of the camera, the image generator superimposing the icon on the captured image only for the posted data set within the angle of view of the camera and excluding from superimposing the icon on the captured image for any posted data set not within the angle of view of the camera;
a transmitter configured to transmit the augmented reality image to the vehicle-mounted apparatus for display of the augmented reality image; and
a line setting part that sets, in accordance with a user operation, a standard line serving as a standard for a position in a vertical direction for superimposing the icon on the captured image.

4. The mobile apparatus according to claim 3, further comprising
a receiver that receives guiding information relating to route guidance to a destination, from the vehicle-mounted apparatus, and wherein
the generator generates the augmented reality image by superimposing the icon and information based on the guiding information on the captured image.

5. The mobile apparatus according to claim 3, further comprising
a display that displays a posted content of the posted data set obtained by the data obtaining part, and wherein
the augmented reality image does not include the posted content of the posted data set.

6. The mobile apparatus according to claim 5, wherein
if there are a plurality of the posted data sets obtained by the data obtaining part, the display preferentially displays the posted content of the posted data set having a smaller distance from the vehicle location to the posted location.

7. The mobile apparatus according to claim 5, wherein
if there are a plurality of the posted data sets obtained by the data obtaining part, the display preferentially displays the posted content of the posted data set having less time from a posted time point to a current time point.

8. The mobile apparatus according to claim 3, wherein
the generator superimposes the icon for the posted data set if the posted data set has a distance from the vehicle location to the posted location that is less than a first distance set by a user.

9. The mobile apparatus according to claim 8, wherein
the generator superimposes the icon for the posted data set if the distance from the vehicle location to the posted location is greater than a second distance and less than the first distance.

10. The mobile apparatus according to claim 3, wherein
if there are a plurality of the icons to be superimposed on the captured image, the generator superimposes the icons for the posted data sets such that the icon for a posted data set that is closer to the vehicle location is in front of the icon for a posted data set that is farther from the vehicle location.

11. The mobile apparatus according to claim 3, wherein
if there are a plurality of the icons to be superimposed on the captured image, the generator superimposes the icons for the posted data sets such that the icon for a posted data set having less time from a posted time point to a current time point is in front of the icon for a posted data set having more time from the posted time point to the current time point.

12. The mobile apparatus according to claim 3, further comprising
a display that displays an operation button for receiving a user operation relating to a content of the augmented reality image.

13. A non-transitory computer-readable recording medium that stores a program to be executed by a computer, the program causing the computer to execute the steps of:
(a) generating a captured image of a vicinity of a vehicle by a camera;
(b) obtaining a vehicle location of the vehicle;
(c) obtaining a direction of an optical axis of the camera;
(d) obtaining a posted data set of a social networking service;
(e) generating an augmented reality image by superimposing, on the captured image generated by the camera, an icon representing the posted data set posted in an objective capturing range of the camera, which is an angle of view of the camera, based on a posted location of the posted data set, the vehicle location, and the direction of the optical axis of the camera, the superimposing including superimposing the icon on the captured image only for the posted data set within the angle of view of the camera and excluding from superimposing the icon on the captured image for any posted data set not within the angle of view of the camera;
(f) transmitting the augmented reality image to a vehicle-mounted apparatus that is mounted on the vehicle and that displays the augmented reality image; and
(g) setting, in accordance with a user operation, a standard line serving as a standard for a position in a vertical direction for superimposing the icon on the captured image.

\* \* \* \* \*